United States Patent
Shelat et al.

(10) Patent No.: US 12,358,792 B2
(45) Date of Patent: Jul. 15, 2025

(54) SYSTEMS AND METHODS FOR PRODUCING HYDROGEN WITH INTEGRATED CAPTURE OF CARBON DIOXIDE

(71) Applicant: 8 Rivers Capital, LLC, Durham, NC (US)

(72) Inventors: Maulik R. Shelat, Macungie, PA (US); Shankar Nataraj, Allentown, PA (US); Yun Wu, Davidson, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 18/910,258

(22) Filed: Oct. 9, 2024

(65) Prior Publication Data

US 2025/0115479 A1    Apr. 10, 2025

Related U.S. Application Data

(60) Provisional application No. 63/588,928, filed on Oct. 9, 2023.

(51) Int. Cl.
*C01B 3/38* (2006.01)
*B01D 53/047* (2006.01)
(Continued)

(52) U.S. Cl.
CPC ............ *C01B 3/384* (2013.01); *B01D 53/047* (2013.01); *C01B 3/48* (2013.01); *C01B 3/56* (2013.01);
(Continued)

(58) Field of Classification Search
CPC .. C01B 3/56; C01B 3/32; C01B 3/501; C01B 3/52; C01B 2203/0227; C01B 2203/0405;
(Continued)

(56) References Cited

U.S. PATENT DOCUMENTS 3,532,467 A   10/1970   Smith et al.
4,185,456 A   1/1980    Cummings
(Continued)

FOREIGN PATENT DOCUMENTS

DE   10 2009 032 718   2/2011
EP   1394103 A1        3/2004
(Continued)

OTHER PUBLICATIONS

Del Popolo Grzona et al., "Design Studies of a Pure Hydrogen Production Plant from Biogas," *International Journal of Hydrogen Energy*, 2025, vol. 52, pp. 1-10.

*Primary Examiner* — Wayne A Langel
*Assistant Examiner* — Syed T Iqbal
(74) *Attorney, Agent, or Firm* — Womble Bond Dickinson (US) LLP

(57) ABSTRACT

The present disclosure provides systems and methods for hydrogen production as well as apparatuses useful in such systems and methods, including steam generation systems and methods. Hydrogen is produced by reforming of a hydrocarbon in a plurality of reformers to achieve improved reforming efficiency. A $CO_2$ convective reformer (CCR) and an oxygen secondary reformer (OSR) are used in series to convert hydrocarbon and steam to synthesis gas with substantially complete carbon capture. Steam generation is provided along separate pathways to provide separate steam streams of different composition.

17 Claims, 3 Drawing Sheets

(51) Int. Cl.
  *C01B 3/48* (2006.01)
  *C01B 3/56* (2006.01)
  *F01K 13/00* (2006.01)
  *F22B 1/18* (2006.01)
(52) U.S. Cl.
  CPC ............... *F01K 13/00* (2013.01); *F22B 1/18* (2013.01); *B01D 2256/16* (2013.01); *B01D 2257/504* (2013.01); *C01B 2203/0233* (2013.01); *C01B 2203/0283* (2013.01); *C01B 2203/043* (2013.01); *C01B 2203/0475* (2013.01); *C01B 2203/0822* (2013.01); *C01B 2203/0827* (2013.01); *C01B 2203/0833* (2013.01); *C01B 2203/1241* (2013.01); *C01B 2203/86* (2013.01)

(58) Field of Classification Search
  CPC ...... C01B 2203/0415; C01B 2203/042; C01B 2203/0475; C01B 2203/0822; B01J 19/0013; B01J 2219/00157; C10J 3/82; C10J 2300/1612; H01M 8/0618; C10K 1/005; Y02E 60/50
  See application file for complete search history.

(56) References Cited

U.S. PATENT DOCUMENTS

| | | | |
|---|---|---|---|
| 4,498,289 A | 2/1985 | Osgerby | |
| 4,725,380 A | 2/1988 | Pinto | |
| 4,869,894 A * | 9/1989 | Wang | C01B 3/16 423/652 |
| 6,048,472 A | 4/2000 | Nataraj et al. | |
| 6,214,066 B1 | 4/2001 | Nataraj et al. | |
| 6,227,894 B1 | 5/2001 | Maeda et al. | |
| 6,296,814 B1 | 10/2001 | Bonk et al. | |
| 6,301,927 B1 | 10/2001 | Reddy | |
| 6,474,069 B1 | 11/2002 | Smith | |
| 6,500,241 B2 | 12/2002 | Reddy | |
| 6,534,551 B2 | 3/2003 | Allam et al. | |
| 6,932,958 B2 | 8/2005 | Wangerow et al. | |
| 6,946,016 B2 | 9/2005 | Reddy | |
| 6,966,171 B2 | 11/2005 | Uematsu et al. | |
| 7,056,480 B2 | 6/2006 | Ogawa | |
| 7,089,727 B2 | 8/2006 | Schütz | |
| 7,138,001 B2 | 11/2006 | Knez et al. | |
| 7,179,324 B2 | 2/2007 | Baksh et al. | |
| 7,182,917 B2 | 2/2007 | Krueger | |
| 7,182,921 B2 | 2/2007 | Miura et al. | |
| 7,192,569 B2 | 3/2007 | Stewart | |
| 7,220,505 B2 | 5/2007 | Malhotra et al. | |
| 7,247,656 B2 | 7/2007 | Guo et al. | |
| 7,252,692 B2 | 8/2007 | Rei | |
| 7,326,482 B2 | 2/2008 | Haltiner, Jr. et al. | |
| 7,341,609 B2 | 3/2008 | DeVries | |
| 7,393,382 B2 | 7/2008 | Givens | |
| 7,399,342 B2 | 7/2008 | Bizjak | |
| 7,404,846 B2 | 7/2008 | Golden et al. | |
| 7,419,648 B2 | 9/2008 | Kuipers et al. | |
| 7,427,368 B2 | 9/2008 | Drnevich | |
| 7,550,215 B2 | 6/2009 | Malhotra et al. | |
| 7,574,855 B2 | 8/2009 | Benz et al. | |
| 7,611,676 B2 | 11/2009 | Inage et al. | |
| 7,628,963 B2 | 12/2009 | Woo et al. | |
| 7,635,399 B2 | 12/2009 | Su | |
| 7,686,856 B2 | 3/2010 | Hemmings et al. | |
| 7,695,708 B2 | 4/2010 | Peng et al. | |
| 7,708,812 B2 | 5/2010 | Shinkai et al. | |
| 7,727,509 B2 | 6/2010 | Abbott et al. | |
| 7,731,935 B2 | 6/2010 | Brady et al. | |
| 7,763,086 B2 | 7/2010 | Woods et al. | |
| 7,763,098 B2 | 7/2010 | Alizadeh-Khiavi et al. | |
| 7,815,892 B2 | 10/2010 | Hershkowitz et al. | |
| 7,828,864 B2 | 11/2010 | Edlund et al. | |
| 7,833,311 B2 | 11/2010 | Givens | |
| 7,833,326 B2 | 11/2010 | Bizjak | |
| 7,837,765 B2 | 11/2010 | Adams et al. | |
| 7,837,973 B2 | 11/2010 | Snyder et al. | |
| 7,883,672 B2 | 2/2011 | Woo et al. | |
| 7,908,842 B2 | 3/2011 | Eroglu et al. | |
| 7,914,764 B2 | 3/2011 | Hershkowitz et al. | |
| 7,931,888 B2 | 4/2011 | Drnevich et al. | |
| 7,932,296 B2 | 4/2011 | Malhotra et al. | |
| 7,950,239 B2 | 5/2011 | Lilley et al. | |
| 7,960,441 B2 | 6/2011 | Wolf | |
| 7,985,399 B2 | 7/2011 | Drnevich et al. | |
| 7,988,948 B2 | 8/2011 | Guvelioglu et al. | |
| 8,021,464 B2 | 9/2011 | Gauthier et al. | |
| 8,025,862 B2 | 9/2011 | Rojey et al. | |
| 8,034,321 B2 | 10/2011 | Mauthner et al. | |
| 8,038,748 B2 | 10/2011 | Edlund | |
| 8,038,771 B2 | 10/2011 | Bizjak | |
| 8,070,841 B2 | 12/2011 | Adams et al. | |
| 8,080,070 B2 | 12/2011 | Grover | |
| 8,097,371 B2 | 1/2012 | Suehiro et al. | |
| 8,110,022 B2 | 2/2012 | DeVries | |
| 8,124,049 B2 | 2/2012 | Grover | |
| 8,137,422 B2 | 3/2012 | Licht et al. | |
| 8,177,868 B2 | 5/2012 | Johnston | |
| 8,187,363 B2 | 5/2012 | Grover | |
| 8,206,669 B2 | 6/2012 | Schaffer et al. | |
| 8,240,370 B2 | 8/2012 | Palamara et al. | |
| 8,257,452 B2 | 9/2012 | Menzel | |
| 8,257,668 B2 | 9/2012 | Mukai et al. | |
| 8,263,274 B2 | 9/2012 | Sonnichsen et al. | |
| 8,268,024 B2 | 9/2012 | Price | |
| 8,273,139 B2 | 9/2012 | Malhotra et al. | |
| 8,273,489 B2 | 9/2012 | Ukai et al. | |
| 8,287,763 B2 | 10/2012 | Pham et al. | |
| 8,303,930 B2 | 11/2012 | Chen et al. | |
| 8,375,723 B2 | 2/2013 | Benz et al. | |
| 8,394,174 B2 | 3/2013 | Chen et al. | |
| 8,414,666 B2 | 4/2013 | Palamara et al. | |
| 8,419,829 B2 | 4/2013 | Wallace | |
| 8,449,633 B2 | 5/2013 | Pham et al. | |
| 8,449,649 B2 | 5/2013 | Greenough | |
| 8,460,630 B2 | 6/2013 | Niitsuma et al. | |
| 8,486,180 B2 | 7/2013 | Chen | |
| 8,535,638 B2 | 9/2013 | Terrien et al. | |
| 8,551,217 B2 | 10/2013 | Baksh et al. | |
| 8,596,075 B2 | 12/2013 | Allam et al. | |
| 8,597,383 B2 | 12/2013 | Pham et al. | |
| 8,617,294 B2 | 12/2013 | Adams et al. | |
| 8,623,563 B2 | 1/2014 | Anzai | |
| 8,636,922 B2 | 1/2014 | Grover et al. | |
| 8,671,688 B2 | 3/2014 | Rogers et al. | |
| 8,673,135 B2 | 3/2014 | Colyar et al. | |
| 8,685,282 B2 | 4/2014 | Iaquaniello | |
| 8,685,358 B2 | 4/2014 | Allam | |
| 8,690,972 B2 | 4/2014 | Takata et al. | |
| 8,692,034 B2 | 4/2014 | Han | |
| 8,702,823 B2 | 4/2014 | Kani et al. | |
| 8,715,617 B2 | 5/2014 | Genkin et al. | |
| 8,726,628 B2 | 5/2014 | Wichmann et al. | |
| 8,747,498 B2 | 6/2014 | Taguchi et al. | |
| 8,747,806 B2 | 6/2014 | Catchpole | |
| 8,752,390 B2 | 6/2014 | Wright et al. | |
| 8,769,961 B2 | 7/2014 | Allam | |
| 8,771,637 B2 | 7/2014 | Wynn et al. | |
| 8,776,532 B2 | 7/2014 | Allam et al. | |
| 8,784,531 B2 | 7/2014 | Okada et al. | |
| 8,790,618 B2 | 7/2014 | Adams et al. | |
| 8,808,425 B2 | 8/2014 | Genkin et al. | |
| 8,852,456 B2 | 10/2014 | Valentin et al. | |
| 8,869,889 B2 | 10/2014 | Palmer et al. | |
| 8,900,355 B2 | 12/2014 | White et al. | |
| 8,900,546 B2 | 12/2014 | Van De Graaf et al. | |
| 8,916,304 B2 | 12/2014 | Tamura et al. | |
| 8,926,866 B2 | 1/2015 | Kim et al. | |
| 8,959,887 B2 | 2/2015 | Allam et al. | |
| 8,986,002 B2 | 3/2015 | Palmer et al. | |
| 8,986,631 B2 | 3/2015 | Berggren et al. | |
| 8,992,642 B2 | 3/2015 | Vik | |
| 8,992,669 B2 | 3/2015 | Ideda et al. | |

(56) References Cited

U.S. PATENT DOCUMENTS

| | | |
|---|---|---|
| 9,028,794 B2 | 5/2015 | Darde et al. |
| 9,040,011 B2 | 5/2015 | Filippi et al. |
| 9,061,911 B2 | 6/2015 | Azad |
| 9,062,608 B2 | 6/2015 | Allam et al. |
| 9,068,743 B2 | 6/2015 | Palmer et al. |
| 9,073,007 B2 | 7/2015 | Park et al. |
| 9,079,770 B2 | 7/2015 | Ahmed et al. |
| 9,101,899 B2 | 8/2015 | Singh et al. |
| 9,126,172 B2 | 9/2015 | Singh et al. |
| 9,132,402 B2 | 9/2015 | Singh et al. |
| 9,216,903 B2 | 12/2015 | McKenna et al. |
| 9,227,844 B2 | 1/2016 | Han et al. |
| 9,240,604 B2 | 1/2016 | Maenishi et al. |
| 9,242,206 B2 | 1/2016 | Okada et al. |
| 9,249,690 B2 | 2/2016 | Karni et al. |
| 9,260,303 B2 | 2/2016 | Filippi et al. |
| 9,309,130 B2 | 4/2016 | Peng et al. |
| 9,321,643 B2 | 4/2016 | Denis et al. |
| 9,321,655 B2 | 4/2016 | Singh et al. |
| 9,327,973 B1 | 5/2016 | Tsai et al. |
| 9,358,506 B2 | 6/2016 | Cheiky |
| 9,359,201 B2 | 6/2016 | Simakov et al. |
| 9,365,131 B2 | 6/2016 | Jamal et al. |
| 9,399,607 B2 | 7/2016 | Tsai et al. |
| 9,415,298 B1 | 8/2016 | Statzer et al. |
| 9,416,728 B2 | 8/2016 | Palmer et al. |
| 9,493,350 B2 | 11/2016 | Morico et al. |
| 9,523,312 B2 | 12/2016 | Allam et al. |
| 9,550,671 B2 | 1/2017 | Darde et al. |
| 9,556,026 B1 | 1/2017 | Davis et al. |
| 9,556,027 B2 | 1/2017 | Chakravarti et al. |
| 9,580,314 B2 | 2/2017 | Darde et al. |
| 9,583,776 B2 | 2/2017 | Thornton et al. |
| 9,586,819 B2 | 3/2017 | Xu et al. |
| 9,617,152 B2 | 4/2017 | Johnston |
| 9,637,427 B2 | 5/2017 | Tsai et al. |
| 9,685,672 B2 | 6/2017 | Iiyama et al. |
| 9,745,191 B2 | 8/2017 | Pham et al. |
| 9,776,862 B2 | 10/2017 | Fujisawa et al. |
| 9,776,863 B2 | 10/2017 | Iaquaniello et al. |
| 9,802,820 B2 | 10/2017 | Iaquaniello et al. |
| 9,806,364 B2 | 10/2017 | Jamal et al. |
| 9,869,245 B2 | 1/2018 | Allam et al. |
| 9,914,643 B2 | 3/2018 | Allam |
| 9,917,320 B2 | 3/2018 | Thornton et al. |
| 9,944,522 B2 | 4/2018 | Cheiky |
| 9,969,666 B1 | 5/2018 | Roesch et al. |
| 10,008,730 B2 | 6/2018 | Jamal et al. |
| 10,018,115 B2 | 7/2018 | Allam et al. |
| 10,046,673 B1 | 8/2018 | Allam et al. |
| 10,047,671 B2 | 8/2018 | Allam et al. |
| 10,066,870 B2 | 9/2018 | Klein |
| 10,071,909 B2 | 9/2018 | Beltramini et al. |
| 10,093,542 B2 | 10/2018 | Beltramini et al. |
| 10,131,593 B2 | 11/2018 | Okada et al. |
| 10,155,661 B2 | 12/2018 | Kang et al. |
| 10,160,704 B2 | 12/2018 | Roesch et al. |
| 10,218,020 B2 | 2/2019 | Jamal et al. |
| 10,246,326 B2 | 4/2019 | Chlapik et al. |
| 10,252,910 B2 | 4/2019 | Beltramini et al. |
| 10,252,911 B2 | 4/2019 | Beltramini et al. |
| 10,256,489 B2 | 4/2019 | Kakuwa et al. |
| 10,281,203 B2 | 5/2019 | Guillard et al. |
| 10,283,795 B2 | 5/2019 | Jamal et al. |
| 10,288,346 B2 | 5/2019 | Guillard et al. |
| 10,302,357 B2 | 5/2019 | Hernandez et al. |
| 10,308,508 B2 | 6/2019 | Saloway |
| 10,370,248 B2 | 8/2019 | Kang et al. |
| 10,393,431 B2 | 8/2019 | Roesch et al. |
| 10,415,434 B2 | 9/2019 | Allam et al. |
| 10,422,252 B2 | 9/2019 | Allam et al. |
| 10,464,818 B2 | 11/2019 | Filippi et al. |
| 10,472,236 B2 | 11/2019 | Farace et al. |
| 10,533,494 B2 | 1/2020 | Xiao et al. |
| 10,549,991 B2 | 2/2020 | Wix et al. |
| 10,626,014 B2 | 4/2020 | Nicholson et al. |
| 10,633,313 B1 | 4/2020 | Roesch et al. |
| 10,634,048 B2 | 4/2020 | Forrest et al. |
| 10,634,425 B2 | 4/2020 | Guillard et al. |
| 10,662,127 B2 | 5/2020 | Beauchamp et al. |
| 10,703,629 B2 | 7/2020 | Saloway |
| 10,710,893 B2 | 7/2020 | Ostuni et al. |
| 10,745,276 B2 | 8/2020 | Warta et al. |
| 10,746,461 B2 | 8/2020 | Allam |
| 10,849,714 B2 | 12/2020 | Lehtonen et al. |
| 10,899,612 B2 | 1/2021 | Seo et al. |
| 10,919,761 B2 | 2/2021 | Lehmann et al. |
| 10,960,372 B2 | 3/2021 | Verykios et al. |
| 10,961,122 B2 | 3/2021 | Verykios et al. |
| 10,975,766 B2 | 4/2021 | Allam et al. |
| 10,988,379 B2 | 4/2021 | Fedorov et al. |
| 10,989,113 B2 | 4/2021 | Forrest et al. |
| 11,059,011 B2 | 7/2021 | Yukumoto et al. |
| 11,066,298 B2 | 7/2021 | Rafati et al. |
| 11,091,704 B2 | 8/2021 | Wegerer et al. |
| 11,130,676 B2 | 9/2021 | Nicholson et al. |
| 11,149,634 B2 | 10/2021 | Callahan |
| 11,149,636 B2 | 10/2021 | Callahan |
| 11,168,045 B2 | 11/2021 | Moreo |
| 11,174,208 B2 | 11/2021 | Beauchamp et al. |
| 11,174,759 B2 | 11/2021 | Allam et al. |
| 11,207,649 B2 | 12/2021 | Hoffman et al. |
| 11,208,323 B2 | 12/2021 | Forrest et al. |
| 11,213,795 B2 | 1/2022 | Hassler et al. |
| 11,231,224 B2 | 1/2022 | Allam et al. |
| 11,253,831 B2 | 2/2022 | Verykios et al. |
| 11,285,437 B2 | 3/2022 | Lu et al. |
| 11,305,250 B2 | 4/2022 | Verykios et al. |
| 11,345,593 B2 | 5/2022 | Mortensen |
| 11,351,517 B2 | 6/2022 | Ulber et al. |
| 11,383,978 B2 | 7/2022 | Verykios et al. |
| 11,434,133 B2 | 9/2022 | Song et al. |
| 11,441,838 B2 | 9/2022 | Vu et al. |
| 11,465,094 B2 | 10/2022 | Rah et al. |
| 11,479,462 B1 | 10/2022 | Spicer |
| 11,485,635 B2 | 11/2022 | Kawamoto et al. |
| 11,485,637 B2 | 11/2022 | Coleman et al. |
| 11,491,437 B2 | 11/2022 | Gary et al. |
| 11,491,456 B2 | 11/2022 | Ko |
| 11,492,254 B2 | 11/2022 | Harale et al. |
| 11,492,255 B2 | 11/2022 | Younes et al. |
| 11,506,122 B2 | 11/2022 | Allam et al. |
| 11,512,257 B1 | 11/2022 | Spicer et al. |
| 11,535,514 B2 | 12/2022 | Mays et al. |
| 11,554,955 B2 | 1/2023 | Tranier |
| 11,583,798 B2 | 2/2023 | Chai et al. |
| 11,583,824 B2 | 2/2023 | Harale et al. |
| 11,597,649 B2 | 3/2023 | Krishnamoorthy et al. |
| 11,607,657 B2 | 3/2023 | Verykios et al. |
| 11,608,266 B2 | 3/2023 | Moore et al. |
| 11,614,280 B2 | 3/2023 | Ko |
| 11,618,676 B2 | 4/2023 | Hill et al. |
| 2002/0004152 A1 | 1/2002 | Clawson et al. |
| 2002/0146359 A1 | 10/2002 | Lomax |
| 2005/0080146 A1 | 4/2005 | Abbott et al. |
| 2007/0130957 A1 | 6/2007 | Hoffmann et al. |
| 2007/0231244 A1 | 10/2007 | Shah et al. |
| 2010/0176346 A1 | 7/2010 | Musich |
| 2010/0263385 A1 | 10/2010 | Allam |
| 2012/0277327 A1 | 11/2012 | Han et al. |
| 2012/0291481 A1 | 11/2012 | Terrien |
| 2012/0292574 A1 | 11/2012 | Terrien et al. |
| 2012/0301391 A1 | 11/2012 | Basini et al. |
| 2013/0205746 A1 | 8/2013 | Allam et al. |
| 2015/0291438 A1 | 10/2015 | Merritt |
| 2016/0363368 A1 | 12/2016 | Zanganeh et al. |
| 2017/0204335 A1 | 7/2017 | Ravikumar |
| 2018/0128172 A1 | 5/2018 | Allam |
| 2018/0363550 A1 | 12/2018 | Allam et al. |
| 2019/0135626 A1 | 5/2019 | Rafati et al. |
| 2019/0337801 A1 | 11/2019 | Ulber et al. |
| 2020/0172395 A1 | 6/2020 | Choi et al. |
| 2020/0307997 A1 | 10/2020 | Trainier |
| 2020/0368667 A1 | 11/2020 | Obata et al. |

(56) References Cited

U.S. PATENT DOCUMENTS

| | | |
|---|---|---|
| 2020/0406212 A1 | 12/2020 | Mortensen et al. |
| 2021/0139794 A1 | 5/2021 | Mukthiyar et al. |
| 2021/0155478 A1 | 5/2021 | Shrivastava et al. |
| 2021/0179425 A1 | 6/2021 | Ott |
| 2021/0252471 A1 | 8/2021 | Park |
| 2021/0300757 A1 | 9/2021 | Tadiello et al. |
| 2021/0323818 A1 | 10/2021 | Rafati et al. |
| 2021/0395085 A1 | 12/2021 | Paglieri et al. |
| 2022/0040626 A1 | 2/2022 | Coleman et al. |
| 2022/0048768 A1 | 2/2022 | Schmidt et al. |
| 2022/0089437 A1 | 3/2022 | Shrivastava et al. |
| 2022/0099003 A1 | 3/2022 | Lu et al. |
| 2022/0136700 A1 | 5/2022 | Strand et al. |
| 2022/0143549 A1 | 5/2022 | Bauer et al. |
| 2022/0144634 A1 | 5/2022 | Schmidt et al. |
| 2022/0168687 A1 | 6/2022 | Hill |
| 2022/0169500 A1 | 6/2022 | Ko |
| 2022/0169501 A1 | 6/2022 | Matsuo et al. |
| 2022/0185666 A1 | 6/2022 | Streb et al. |
| 2022/0194789 A1 | 6/2022 | Christensen et al. |
| 2022/0203297 A1 | 6/2022 | Lu et al. |
| 2022/0212925 A1 | 7/2022 | Albuali et al. |
| 2022/0212926 A1 | 7/2022 | Wedhaya et al. |
| 2022/0212927 A1 | 7/2022 | Bamagain et al. |
| 2022/0212928 A1 | 7/2022 | Østberg et al. |
| 2022/0212949 A1 | 7/2022 | Fadhel et al. |
| 2022/0219975 A1 | 7/2022 | Feinstein |
| 2022/0219978 A1 | 7/2022 | Tewari et al. |
| 2022/0234018 A1 | 7/2022 | Mackic et al. |
| 2022/0259042 A1 | 8/2022 | Ravikumar et al. |
| 2022/0267147 A1 | 8/2022 | Ravikumar et al. |
| 2022/0306463 A1 | 9/2022 | Cruz et al. |
| 2022/0306464 A1 | 9/2022 | Cruz et al. |
| 2022/0306468 A1 | 9/2022 | Cady et al. |
| 2022/0331768 A1 | 10/2022 | Ko |
| 2022/0396480 A1 | 12/2022 | Edlund |
| 2023/0002224 A1 | 1/2023 | Younes et al. |
| 2023/0042457 A1 | 2/2023 | Allam et al. |
| 2023/0061332 A1 | 3/2023 | Stroffolino, IV |
| 2023/0089656 A1 | 3/2023 | Galliot et al. |
| 2023/0104475 A1 | 4/2023 | Nam et al. |
| 2023/0105183 A1 | 4/2023 | Nam et al. |
| 2023/0107936 A1 | 4/2023 | You et al. |

FOREIGN PATENT DOCUMENTS

| | | |
|---|---|---|
| EP | 3974379 | 3/2022 |
| KR | 2011-0133782 | 12/2011 |
| WO | WO 2009/105305 | 8/2009 |
| WO | WO 2012/123752 | 9/2012 |
| WO | WO 2021/055185 | 3/2021 |
| WO | WO 2021/055186 | 3/2021 |
| WO | WO 2021/075802 | 4/2021 |
| WO | WO 2021/083776 | 5/2021 |
| WO | WO 2021/117875 | 6/2021 |
| WO | WO 2021/175662 | 9/2021 |
| WO | WO 2021/189137 | 9/2021 |
| WO | WO 2021/223733 | 11/2021 |
| WO | WO 2021/257944 | 12/2021 |
| WO | WO 2022/003313 | 1/2022 |
| WO | WO 2022/034283 | 2/2022 |
| WO | WO 2022/034284 | 2/2022 |
| WO | WO 2022/034285 | 2/2022 |
| WO | WO 2022/038090 | 2/2022 |
| WO | WO 2022/040677 | 2/2022 |
| WO | WO 2022/100899 | 5/2022 |
| WO | WO 2022/106058 | 5/2022 |
| WO | WO 2022/145618 | 7/2022 |
| WO | WO 2022/173263 | 8/2022 |
| WO | WO 2022/180740 | 9/2022 |
| WO | WO 2022/219822 | 10/2022 |
| WO | WO 2022/229838 | 11/2022 |
| WO | WO 2022/241593 | 11/2022 |
| WO | WO 2022/253460 | 12/2022 |
| WO | WO2022/263613 | 12/2022 |

\* cited by examiner

SYSTEMS AND METHODS FOR PRODUCING HYDROGEN WITH INTEGRATED CAPTURE OF CARBON DIOXIDE

CROSS-REFERENCE TO RELATED APPLICATIONS

The present application claims priority to U.S. Provisional Patent Application No. 63/588,928, filed Oct. 9, 2023, the disclosure of which is incorporated herein.

FIELD OF THE DISCLOSURE

The present disclosure provides for production of hydrogen. More particularly, the disclosure provides apparatuses that are configured for use in hydrogen production and methods for producing hydrogen that can incorporate the apparatuses. The apparatuses and methods may utilize a plurality of steps in reforming a hydrocarbon to a synthesis gas that is processed for production of hydrogen.

BACKGROUND

Hydrogen combustion for energy production produces only water, but when hydrocarbon fuels are burned for energy production both water and carbon dioxide are produced. Hydrogen replacing hydrocarbon fuels along with renewable energy production from wind and solar systems is the best route to achieving low to zero anthropogenic emission of carbon dioxide and helping to address climate change. Hydrogen may replace natural gas in the pipeline distribution network supplying fuel for domestic, commercial, and industrial heating.

Hydrogen can be produced by steam methane reforming or gasification of hydrocarbons, such as coal, natural gas, or methane. The most widely used process is steam natural gas catalytic reforming. The reactions taking place are shown in Equations 1 and 2.

$$C_mH_{2n} + mH_2O = mCO + (n+m)H_2 \quad \text{Eq. 1}$$

$$CO + H_2O = CO_2 + H_2 \text{ (that is, "shift" reactions)} \quad \text{Eq. 2}$$

The catalytic steam methane reforming (SMR) reaction is endothermic. Heat for the reforming reactions is typically supplied by burning methane, a waste fuel gas, or a tail gas in a radiant furnace. A radiant furnace is often configured with an array of thick-walled tubes filled with catalyst. Within the tubes and in the presence of the catalyst, the reaction product of carbon monoxide and hydrogen, called "synthesis gas" or "syngas", forms from hydrocarbon and steam. The syngas is then cooled and passed through one or more water gas shift (WSG) reactors, where the carbon monoxide reacts with water in the presence of a catalyst per Equation 2, to generate more molecular hydrogen from the water and form carbon dioxide from the carbon monoxide.

An alternative process for production of syngas from hydrocarbon feed is the partial oxidation (POX) of natural gas using pure oxygen according to the reaction shown in Equation 3.

$$CH_4 + 0.5\,O_2 = CO + 2H_2 \quad \text{Eq. 3}$$

The partial oxidation reaction is slightly exothermic, but the reactor must operate at a relatively high discharge temperature for the maximum conversion of the hydrocarbon feed to occur with a reasonable residence time in the reactor. An auto-thermal reformer (ATR) may also be utilized for production of syngas. This can comprise a POX burner operating with excess methane plus added steam with the hot exhaust gas passing through a bed of steam/methane reforming catalyst where further hydrogen generation takes place according to the reaction of Equation 1. The high temperature syngas product from these processes is cooled in a steam generator, which produces the steam required for the reactions. All the processes generate an amount of excess heat that must be exported in the form of steam production or generated electric power.

The foregoing processes relying on conversion of hydrocarbons can be referenced based upon the associated emissions, such as carbon dioxide. When carbon capture is appropriately carried out in generating hydrogen from natural gas, the result is so-called "blue" hydrogen. Blue hydrogen indicates hydrogen production with capture of carbon dioxide and carbon monoxide in a range of from about at least 85% capture, such as from about at least 95% capture.

The carbon dioxide present in the crude hydrogen streams formed through steam methane reforming and gasification methods can be removed by using chemical solvents, such as methyldiethanolamine (MDEA), or physical solvents, such as Selexol™. A system described in U.S. Pat. No. 8,900,355 (to White, et al.) separates carbon dioxide by condensation at a temperature close to the carbon dioxide solidification point, where the partial pressure of carbon dioxide is minimized. The uncondensed gas can then be recycled to the syngas generation system. Each of the methods described can result in the removal of at least 90% and preferably near 100% of the carbon dioxide derived from carbon in the methane feed gas.

SUMMARY OF THE DISCLOSURE

The steam/methane catalytic hydrogen system (SMR) has the advantage of catalytically oxidizing the methane with water to form the hydrogen product and the carbon dioxide byproduct so that no added oxygen is required. The disadvantage of the current SMR system is that carbon dioxide must be removed from the shifted syngas using chemical or physical methods. After removing the $CO_2$, the PSA (pressure swing absorption) gas can then be used as fuel. Alternatively, a large quantity of methane and all the PSA waste gas containing the entire carbon dioxide product may be used as fuel gas in the reformer furnace to provide the heat of reaction plus the preheat for the reaction products; however, the carbon dioxide must then be removed from the stack gas. Removing large volumes of carbon dioxide at near atmospheric pressure is costly and reduces overall process efficiency.

The present disclosure relates to hydrogen production methods, individual pieces of equipment or apparatuses that are useful for hydrogen production, and combinations of pieces of the equipment or apparatuses that together can define systems, units, or plants that are configured for hydrogen production. The hydrogen production of the present disclosure can be carried out so that produced hydrogen with increased purity of product is produced at increased process efficiency through embodiment combinations of system components and system operational procedures. The hydrogen production can exhibit increased efficiency through use of oxy-fuel combustion, which provides process heat and an integrated feature for processing waste gases back through the process, utilizing the potential heat of combustion in the waste gas. Oxy-fuel combustion produces substantially only carbon dioxide and steam as the combustion products. The produced steam may be condensed at pressure, leaving only pressurized carbon dioxide without requiring a separate carbon dioxide removal system. The hydrogen production system can demonstrate enhanced process efficiency and reduced materials costs over traditional systems through the utilization of specifically-chosen component parts for the embodiment unit/system/plant.

The present disclosure provides for hydrogen production methods utilizing oxy-fuel combustion as well as systems suitable for carrying out the methods for use. These systems and methods may utilize a variety of combinations of components and process steps as described. In some embodiments, the hydrogen production method can be carried out such that a fuel, such as a PSA tail gas, can be substantially or completely combusted within an oxy-fired combustor (combustor) with an oxidant to generate hot combustion gases comprising predominately carbon dioxide and water in a range of from about at least 80 weight percent (wt. %), such as from about at least 85 wt. %, such as about at least 90 wt. %, or such as about at least 95 wt. %. These hot combustion gases can be cooled in a $CO_2$ convective reformer (CCR) on the heating side to provide the heat for reforming of natural gas and steam into syngas on the process side. The partially reformed gas from the CCR can be further reformed in an oxygen secondary reformer (OSR). Carbon monoxide in the syngas effluent from the OSR can be introduced into and reacted to form additional hydrogen in one or more downstream WGS reactor(s). The raw hydrogen product passing from the last WGS reactor can be dewatered and then purified in a PSA, thereby isolating substantially or completely all the carbonaceous residue into the PSA tail gas to serve as fuel to the combustor. The cooled combustion gases from the shell side of the CCR, comprising essentially carbon dioxide and water, can be further cooled and dewatered to generate a raw carbon dioxide stream. All or part of this stream can be further purified to generate a carbon dioxide sequestration product. In some embodiments, at least part of this stream comprising essentially carbon dioxide and water can be mixed with oxygen from an oxygen source (for example, an air separation unit) to provide the oxidant to the combustor. Supplementary oxygen also can be provided to the OSR to support reforming.

In some embodiments, a hydrogen production plant according to the present disclosure can comprise: a combustor configured to produce a stream of predominately carbon dioxide at elevated temperature; a CCR arranged to receive the stream of predominately carbon dioxide for heating of internal components configured for converting a hydrocarbon and steam into a synthesis gas and provide a stream comprising the synthesis gas; an OSR arranged to receive at least a portion of the stream comprising the synthesis gas from the CCR and configured for further converting hydrocarbon and steam remaining in the stream comprising the synthesis gas and provide a combined synthesis gas stream; and one or more components effective for separating a stream of predominately hydrogen from the combined synthesis gas stream. In some embodiments, the hydrogen production plant further can comprise at least one bypass line arranged to divert a portion of the stream of the hydrocarbon and steam to bypass the CCR. In some embodiments, the at least one bypass line can be configured to deliver the portion of the stream of the hydrocarbon and steam that bypasses the CCR to the OSR.

In some embodiments, a process for hydrogen production can comprise: reacting a hydrocarbon with steam in a $CO_2$ convective reformer that is heated by a stream comprising predominately carbon dioxide to convert the hydrocarbon and steam into a synthesis gas and provide a stream comprising the synthesis gas; passing at least a portion of the stream comprising the synthesis gas through an oxygen secondary reformer to form additional synthesis gas and to provide a combined synthesis gas stream; and processing at least a portion of the combined synthesis gas stream in one or more components effective for separating a stream of predominately hydrogen from the combined synthesis gas stream. In some embodiments, the process can further comprise diverting a portion of the stream of the hydrocarbon and steam to at least one bypass line so that the portion of the stream bypasses the CCR. In some embodiments, the at least one bypass line can be configured to deliver the portion of the stream of the hydrocarbon and steam that bypasses the CCR to the OSR.

These and other features, aspects, and advantages of the disclosure will be apparent from a reading of the following detailed description together with the accompanying drawings, which are briefly described. The disclosure includes any combination of elements, components, and features that are described, regardless of whether such elements, components, and features are expressly combined in a specific embodiment description. This disclosure is intended to be read holistically such that any separable features, components, or elements of the disclosure, in any of its various aspects and embodiments, should be viewed as intended to be combinable unless the context clearly dictates otherwise.

In one or more embodiments, which can be combined with other embodiments, the present disclosure can provide a hydrogen production plant. Such hydrogen production plant can comprise: a $CO_2$ convective reformer (CCR) arranged to receive at least one reactant stream through at least a first inlet and a heating fluid stream through at least a second inlet without intermixing of the at least one reactant stream and the heating fluid stream and configured to reform hydrocarbon and steam in the at least one reactant stream and provide a process stream through at least one outlet; an oxygen secondary reformer (OSR) arranged to receive at least a portion of the process stream from the CCR and an oxidant and configured to reform hydrocarbon and steam and provide a synthesis gas stream; and one or more components effective for recovering a stream of predominately hydrogen ($H_2$) from the synthesis gas stream. The hydrogen production plant may be further defined in relation to any one or more of the following statements, which can be combined in any order and in any number.

The hydrogen production plant can comprise a main line arranged to provide a first portion of the at least on reactant stream to the CCR and comprising a bypass line arranged to bypass the CCR and introduce a second portion of the at least one reactant stream to one or more components downstream from the CCR.

The bypass line can be arranged to introduce the second portion of the at least one reactant stream to a line configured for passage of the process stream at a position downstream from the CCR and upstream from the OSR.

The bypass line can be arranged to introduce the second portion of the at least one reactant stream to the OSR.

The hydrogen production plant further can comprise a pre-reformer configured to provide the first portion of the at least one reactant stream through the main line and provide the second portion of the at least one reactant through the bypass line.

The hydrogen production plant further can comprise a pre-reformer configured to provide the at least one reactant stream to the CCR.

The hydrogen production plant further can comprise or an auxiliary steam line arranged for introduction of steam to the CCR.

The main line can be arranged to introduce the first portion of the at least one reactant to the auxiliary steam line.

The hydrogen production further can comprise one or more heat recovery units arranged to receive the synthesis gas from the OSR.

The one or more heat recovery units comprises one or more boilers.

The one or more components effective for recovering a stream of predominately hydrogen from the synthesis gas stream includes a pressure swing adsorption (PSA) unit.

The hydrogen production plant further can comprise one or more water gas shift (WGS) units arranged downstream of the OSR and upstream from the one or more components effective for recovering a stream of predominately hydrogen.

The hydrogen production plant further can comprise a combustor arranged to receive a fuel and an oxidant and configured to form the heating fluid stream, said heating fluid stream comprising carbon dioxide.

The hydrogen production plant further can comprise one or more heat recovery units or heat rejection units arranged to remove heat from the heating fluid stream from the CCR.

The hydrogen production plant further can comprise one or more purification units arranged to receive at least a portion of the heating fluid stream from the one or more heat recovery units.

The hydrogen production plant further can comprise a recycle line arranged to deliver at least a portion of the heating fluid stream to the combustor.

The hydrogen production plant further can comprise one or more turbines arranged to receive a stream of pressurized steam from the one or more heat recovery units.

The hydrogen production plant further can comprise a line arranged for passage of a tail gas to the combustor from the one or more components effective for recovering a stream of predominately hydrogen.

The CCR can have a tube-in-shell arrangement and is configured with a tube side flow path for the at least one reactant stream and the process stream and a separate, shell side flow path for the heating fluid stream.

The CCR can be configured to be non-recuperative.

The CCR can be arranged with one or more tubes through which the process stream flows toward the at least one outlet, the one or more tubes being configured to limit heat transfer through one or more walls thereof.

In one or more embodiments, which can be combined with other embodiments, the present disclosure can provide a process for hydrogen production. Such hydrogen production process can comprise: introducing at least one reactant stream into a $CO_2$ convective reformer (CCR) that is heated by a heating fluid stream and reforming hydrocarbon and steam from the at least one reactant stream to form a process stream; passing an oxidant and at least a portion of the process stream through an oxygen secondary reformer (OSR) operating under conditions effective to reform hydrocarbon and steam and provide a synthesis gas stream; and processing at least a portion of the synthesis gas stream in one or more components effective for recovering a stream of predominately hydrogen ($H_2$) from the synthesis gas stream. The hydrogen production process may be further defined in relation to any one or more of the following statements, which can be combined in any order and in any number.

The process can comprise introducing a first portion of the at least one reactant stream into the CCR and introducing a second portion of the at least one reactant stream into one or more components downstream from the CCR and such that the second portion of the at least one reactant stream bypasses the CCR.

The process can comprise introducing the second portion of the at least one reactant stream to a line configured for passage of the process stream, the introducing being at a position downstream from the CCR and upstream from the OSR.

The process can comprise introducing the second portion of the at least one reactant stream directly into the OSR.

The process further can comprise processing the at least one reactant stream in a pre-reformer from which the first portion of the at least one reactant stream passes to the CCR and from which the second portion of the at least one reactant stream passes to the one or more components downstream from the CCR.

The first portion of the at least one reactant stream can be combined with an auxiliary steam stream that is introduced to the CCR.

The process can comprise passing the synthesis gas stream from the OSR through one or more heat recovery units configured to transfer heat from the synthesis gas stream to one or more further streams.

The one or more heat recovery units can comprise one or more boilers.

The one or more components effective for separating a stream of predominately hydrogen from the synthesis gas stream can include a pressure swing adsorption (PSA) unit.

The process further can comprise passing at least a portion of the synthesis gas stream from the OSR through one or more water gas shift (WGS) units downstream from the OSR and upstream from the one or more components effective for separating a stream of predominately hydrogen.

The process further can comprise combusting a fuel with an oxidant in a combustor to form a combustion product stream that comprises at least a portion of the heating fluid stream.

The process further can comprise passing the heating fluid stream from the CCR through one or more heat recovery units configured to transfer heat from the heating fluid stream to one or more further streams and form a spent heating fluid stream.

The process further can comprise passing the spent heating fluid stream through one or more purification units effective to form a stream of recycle carbon dioxide ($CO_2$).

The process further can comprise passing at least a portion of the stream of recycle $CO_2$ to the combustor.

One or more components effective for separating a stream of predominately hydrogen from the synthesis gas stream can be further effective to provide a tail gas, and the process can comprise introducing at least a portion of the tail gas to the combustor.

In one or more embodiments, which can be combined with other embodiments, the present disclosure can provide a steam generation system. Such steam generation system can comprise: a reforming envelope configured with a heating line or series of lines for passage of heat source stream from a heat source; and a steam generation envelope comprising: a first steam generation pathway comprising a first water line or series of lines arranged for passage of water from a first water source to a first heat exchange train and passage of steam from the first heat exchange train to one or more steam turbines; and a second steam generation pathway comprising a second water line or series of lines arranged for passage of water from a second water source to a second heat exchange train and passage of steam from the second heat exchange train. The steam generation system may be further defined in relation to any one or more of the following statements, which can be combined in any order and in any number.

The first water line or series of lines can be separate from the second water line or series of lines for an entire length of the first steam generation pathway and an entire length of the second steam generation pathway.

The first heat exchange train and the second heat exchange train can include one or more components in common.

The heat source can be a syngas production unit.

The steam generation system can comprise a first heating line or series of lines for passage of a first heat source stream from a first heat source and a second heating line or series of lines for passage of a second heat source stream from a second heat source.

One of the first heat source stream and the second heat source stream is not a syngas stream.

In one or more embodiments, which may be combined with other embodiments, the present disclosure can provide a steam generation method. Such steam generation method can comprise: forming steam along a first steam generation pathway by heating water from a first water source using heat from a heat source stream; and forming steam along a second steam generation pathway by heating water from a second water source using heat from the heat source stream; wherein the water from the first water source is not intermixed with the water from the second water source and steam in the first steam generation pathway is not intermixed with steam in the second steam generation pathway. The steam generation system may be further defined in relation to any one or more of the following statements, which can be combined in any order and in any number.

The first water source and the second water source can have different compositions.

One of the first water source and the second water source can comprise steam turbine condensates, and the other of the first water source and the second water source can comprise process stream condensates.

The steam generation method can comprise forming steam along the first steam generation pathway by heating water from the first water source using heat from a first heat source stream, and forming steam along the second steam generation pathway by heating water from the second water source using heat from a second heat source stream.

The first heat source stream can be received from a first heat source, the second heat source stream can be received from a second heat source, and one or both of the first heat source and the second heat source can be a syngas production unit.

One of the first heat source stream and the second heat source stream is not a syngas stream.

One of the first steam generation pathway and the second steam generation pathway can comprise one or more steam turbines configured for power production.

BRIEF DESCRIPTION OF THE FIGURES

Reference will now be made to the accompanying drawings, which is not necessarily drawn to scale, and which should be viewed as illustrating example embodiments of the presently disclosed subject matter.

DETAILED DESCRIPTION OF THE DISCLOSURE

Figure 1:
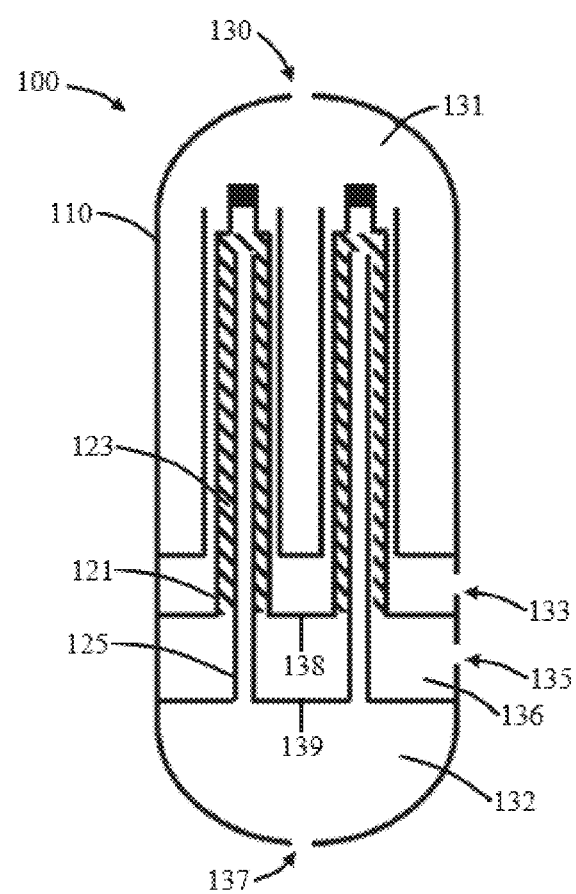
FIG. 1 illustrates a convective reforming reactor according to one or more embodiments of the present disclosure.

The present subject matter will now be described more fully with reference to one or more embodiments thereof. These one or more embodiments are described so that this disclosure will be thorough and complete, and will fully convey the scope of the subject matter to those skilled in the art. The subject matter can be embodied in many different forms and should not be construed as limited to the embodiments as set forth; rather, these embodiments are provided so that this disclosure will satisfy applicable legal requirements. As used in the specification, and in the appended claims, the singular forms "a", "an", and "the", include plural referents unless the context clearly dictates otherwise.

The present disclosure provides for manners of hydrogen production and processes, systems, and equipment that can individually or in combination exhibit the improvements in the production of hydrogen. Several embodiments are provided, and the several embodiments are described individually only for ease of disclosure and ease of understanding. The several embodiments, however, are expressly intended to be useful individually or in any combination. One of ordinary skill in the art understands that each embodiment provides one or more improvements in hydrogen production arising from the specific features of the individual embodiment. The individual embodiments arise from recognition of shortcomings in the existing methods and equipment used for hydrogen production, and each individual embodiment thus provides a useful improvement and advantage in hydrogen production. The improvements and advantages can be multiplied through combinations of the individual embodiments, and the unique features of each embodiment are evidence that the improvements achieved with the combinations of the embodiments are not an expected, cumulative effect but are rather synergistic effects arising from the various combinations of the individual embodiments.

The present disclosure provides for oxy-fuel hydrogen production systems and methods that can utilize carbon dioxide removal to provide a source of "blue" hydrogen. Such systems and methods previously have been described in U.S. Pat. No. 11,691,874 (to Allam), the disclosure of which is incorporated by reference. The present systems and methods can incorporate one or more elements from this previous disclosure while adding further component(s) and processing step(s) effective to increase overall process efficiency.

A hydrogen production system or unit according to the present disclosure can include all of the process components necessary for utilizing inputs of only hydrocarbon, oxygen, and water, and provide outputs of substantially pure hydrogen, carbon dioxide for use or sequestration, and, optionally, excess water. The combined parts define a system for producing hydrogen, as well as carbon dioxide suitable for sequestration, and the system or unit can be combined with further industrial equipment and plants so that the produced hydrogen can be used as a feed stream downstream facilities. The hydrogen production unit, however, may also be operated without combination with other upstream or downstream equipment or plants, and the hydrogen production unit may thus be operated as a stand-alone hydrogen production plant to export hydrogen as a product. In various embodiments, a hydrogen production unit, system, or plant can comprise the following: a CCR as otherwise described; an oxy-fuel combustor arranged to produce a combustion product stream that can be introduced to the CCR as a heating fluid; an oxygen secondary reformer (OSR) arranged for processing of the syngas provided by the CCR; one or more water gas shift (WGS) reactors arranged to receive a syngas product that is formed in the CCR and OSR; one or more hydrogen isolation units, which can comprise only one or more pressure swing absorbers (PSA) or can also comprise one or more separation membranes and one or more compressors; one or more turbines arranged to expand one or more gases to produce power with an associated generator; and a plurality of heat exchanger members, which can include, for example, a waste heat boiler for forming steam from water, such as from water produced in the process and captured, a recuperator heat exchanger, water coolers, and the like. In some embodiments, one or more pumps or compressors may be included for maintaining necessary operating pressures and flow rates in the system. One of ordinary skill in the art understands that the hydrogen production unit, system, or plant can include piping, valves, and control components necessary for operation thereof.

Figure 2:
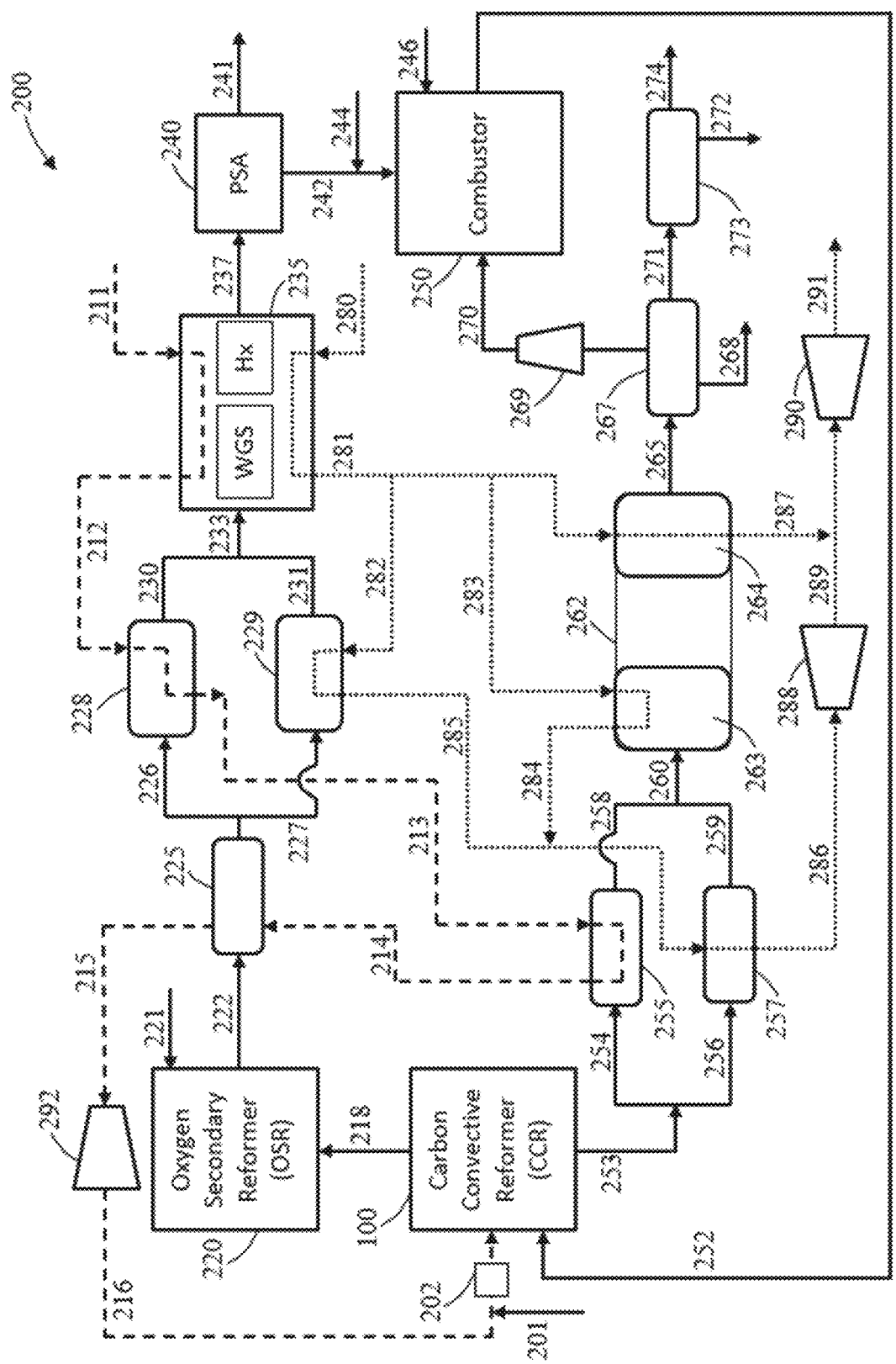
FIG. 2 is a flowchart illustrating steps in a hydrogen production process according to one or more embodiments of the present disclosure.

With the provided general discussion of a hydrogen production unit, system, or plant in mind, FIG. 2 illustrates an arrangement of the components thereof according to an embodiment of the present disclosure. This illustrates a general layout of a hydrogen production unit, system, or plant including the components described. Although specific process conditions of, for example, temperature, pressure, and steam-to-carbon ratio are discussed, one of ordinary skill in the art understands that the provided values are for illustration purposes, and such conditions can be varied within suitable ranges as will be understood according to the further disclosure provided.

With reference to FIG. 2, steam mixed with a hydrocarbon, such as natural gas, which may be desulfurized, is introduced to the tube side of a $CO_2$ convective reformer (CCR) 100, which may alternatively be called a carbon convective reformer. The CCR 100 includes two flow paths: a tube side flow path through which reactants flow for conversion to syngas, such as according to the reaction in Equation 1; and a shell side through which a heating fluid flows to provide heat to the reaction of Equation 1, which is endothermic. The two flow paths are effective to prevent intermixing of the reactant stream and the heating fluid stream in the CCR 100. The two flow paths may be provided, for example, using a tube-in-shell arrangement that can comprise at least one set of concentrically arranged tubes positioned with a containment vessel. Further, each of the at least one set of concentrically arranged tubes can comprise: an outer catalyst tube (or "scabbard"); an inner reaction product gas tube (or "bayonet"); and catalyst material positioned within a space defined between an inside surface of the outer catalyst tube and an outside surface of the inner reaction product gas tube. This is illustrated in FIG. 1, wherein a convective reformer 100 includes a containment vessel 110 and two sets of concentrically arranged tubes therein. Each set is formed of the outer catalyst tube 121, the inner reaction product tube 125, and the catalyst material 123 positioned in the annular space between an outer surface of the inner reaction product tube 125 and an inner surface of the outer catalyst tube 121. The CCR 100 thus can be arranged so that a heating fluid provides the reaction heat while remaining separated from the hydrocarbon and steam reactants and the syngas product that is formed.

In one or more embodiments, which may be combined with other embodiments, the CCR 100 can have an arrangement as illustrated in FIG. 1. The CCR 100 can be configured with several fluid ingress and egress ports, such as a heating fluid inlet 130, a heating fluid outlet 133, a reactant inlet 135, and a reaction product outlet 137. Any of the inlets may be referenced for ease of discussion as being a first inlet, a second inlet, or a third inlet. Likewise, any of the outlets may be referenced as a first outlet, a second outlet, or a third outlet. The heating fluid enters the containment vessel 110 through the heating fluid inlet 130 and passes around the reaction tube sets to provide heating by heat transfer through the walls of the outer catalyst tube 121. This heating is predominately convective; however, in one or more embodiments, which may be combined with other embodiments, a minor portion of the heating can be via other heating modes, such as radiative heating. Hydrocarbon and steam enter the containment vessel 110 through the reactant inlet 135. The reactant inlet 135 provides fluid access to a reactant space 136 that is separated from a heating fluid space 131 by a reactant tube sheet 138, which prevents mixing of the reactants with the heating fluid. As reactants pass through the catalyst material 123, syngas product forms and passes through the inner passage of the inner reaction product tube 125 into a reaction product space 132, which is separated from the reactant space 136 by a product tube sheet 139. The formed syngas exits the pressure vessel 110 through the reaction product outlet 137. As illustrated in FIG. 1, the reactants flow upward through the catalyst while the heating fluid flows down around the so-called "scabbard tubes" and the formed syngas flows down through the so-called "bayonet tubes," that is, the void formed by the interior surface of the inner reaction product tube 125. The directional arrangement of parts as illustrated in FIG. 1 is not intended to be limiting, however, and the parts may be arranged as desired and lead to modifications of directional fluid flows through the convective reformer 100. For example, the parts in FIG. 1 may be arranged so that the reactants flow downward through the catalyst while the heating fluid flows upward around the tubes, and the formed syngas flows upward through the inner reaction product tube.

With reference again to FIG. 2, natural gas or other hydrocarbon gas is introduced through line 201 and mixed with feed steam in line 216 for passage into the CCR 100. In some other embodiments, the natural gas and feed steam may be introduced through separate lines. Non-limiting examples of other hydrocarbon gases include associated gas, refinery offgas (ROG) and vaporized light hydrocarbons, such as propane, butane, or naphtha. It is apparent to a person of ordinary skill in the art that references to natural gas as a feedstock include the use of other hydrocarbons in addition to the natural gas or as an alternative to the natural gas. The stream in line 201 optionally can be desulfurized, such as in a desulfurization unit that includes zinc oxide and is effective for desulfurizing the feedstock by reacting with sulfurous compounds to form zinc sulfide. Additionally, the desulfurization unit can include a catalytic hydrogenating unit comprising known catalysts, such as cobalt-molybdenum or nickel-molybdenum sulfide, that use inherently present $H_2$ or added $H_2$ for hydrogenating organic sulfur species into hydrogen sulfide that reacts with the zinc oxide, further desulfurizing the hydrocarbon feedstock. Prior to desulfurization, the natural gas or other hydrocarbon can be preheated to a temperature of from about 100° C. to about 400° C., such as about 300° C. to about 400° C. Such preheating can be accomplished by heat exchange with any cooling stream within the hydrogen plant. The natural gas and feed steam are provided in amounts so that a steam-to-carbon molar ratio for the reactants used in forming syngas in the CCR 100 is in a range of from about 1 to about 6, such as about 1.2 to about 3.5, such as about 1.5 to about 3, or such as about 1.8 to about 2.5, inclusive of end points and values in-between. After mixing and prior to introduction to the CCR 100, the feed steam and natural gas mixture can be further heated by heat exchange with cooling streams in the hydrogen plant to a temperature in a range of from about 350° C. to about 700° C., such as about 400° C. to about 550° C., or such as about 425° C. to about 525° C., inclusive of end points and values in-between. The preheated mixture of natural gas and feed steam pass through the tube side of the CCR 100, the tubes of which are filled with a suitable reforming catalyst. Heat is provided to the tube side from a heating gas flowing through the shell side of the CCR to support the reforming reactions occurring within the tubes. This heat is utilized to heat up the gases to a reaction temperature in a range of from about 600° C. to about 950° C., such as about 650° C. to about 800° C., such as about 675° C. to about 750° C., inclusive of end points and values in-between, for conversion of the hydrocarbons to syngas by providing heat for the endothermic reforming reaction of Equation 1. The process gas comprising syngas from the tube side is passed and routed to an OSR 220 through line 218.

As the hot reformed syngas flows through the inner tube (bayonet), heat may pass into the reforming gas that is passing through the catalyst bed in the annular space. The hot reformed syngas may be cooled as it passes through the bayonet. The tube-in-tube system can be designed to maximize or minimize this heat transfer. The bayonet tube may be finned or broached to enhance heat transfer. The CCR can be configured such that up to about 30%, such as about 10% to about 30%, such as about 15% to about 30%, or such as about 20% to about 30%, inclusive of end points and values in-between, of the process heat duty that is absorbed by the gas heating up and reforming in the catalyst bed (the so-called reforming duty) is furnished by the cooling, exiting syngas flowing through the bayonet. This is a recuperative design of the CCR in that heat in the hot reformed syngas flowing through the inner tube is recuperated and used to heat the gases in the catalyst bed in the annular space. Alternatively, the CCR can be configured to be non-recuperative. In non-recuperative embodiments, the CCR can be configured such that less than 10% or less than 5% of the reforming duty is furnished by the syngas exiting through the bayonets. The non-recuperative CCR can be configured such that the temperature of the syngas passing through the inner tube is reduced by less than a specified amount. In one or more embodiments, which can be combined with other embodiments, the temperature of the syngas passing through the inner tube is reduced by less than 50° C., such as less than 40° C., such as less than 30° C., or such as less than 20° C., the foregoing have a temperature range bounded at the lower end of about 1° C., such as about 2° C., or such as about 5° C., inclusive of the end points and values in-between. A non-recuperative arrangement of the CCR can include, for example, configuring the bayonets from a material with low thermal conductivity, such as thick-walled alumina, which may be considered to be any alumina material at a thickness of about 0.25 inches (0.63 cm) or greater, such as about 0.5 inches (1.27 cm) or greater, such as up to about 6 inches (15.24 cm). In the alternative, or in combination, the bayonets may be configured with a wall that includes one or more insulating materials on the inner surface or the outer surface of the wall. The insulating materials may be configured as one or more layers on the wall of each bayonet. In one or more embodiments, which may be combined with other embodiments, the CCR may exclude a tube-in-tube configuration. In such embodiments, the CCR may comprise a straight tube-in-shell arrangement, such as is known in the field of heat exchangers, or may comprise parallel coils of fluid embedded in a packed bed.

In the OSR 220, the introduced process gas is reacted with a fresh stream of an oxidant, such as high purity oxygen, introduced through line 221. In one or more embodiments, the oxygen has a purity in a range of from about at least 95 percent molar (mol %) oxygen, such as at least 98 mol % oxygen, such as at least 99 mol % oxygen, such as at least 99.5 mol % oxygen, or such as at least 99.8% mol % oxygen, to increase the temperature within the OSR 220 and drive the reaction such that most of the hydrocarbon is converted into syngas. The hot syngas, which may have a temperature in a range of from about 850° C. to about 1150° C., such as about 900° C. to about 1100° C., or such as about 1000° C. to about 1100° C., inclusive of end points and values in-between, passes from the OSR 220 through line 222 and is subject to other downstream processing steps, such as processing in one or more heat recovery units, such as undergoing water gas shift, or such as undergoing purification to separate hydrogen from a tail gas.

The OSR can operate adiabatically in that a fuel-rich stream, such as syngas, is reacted with an oxidant. The amount of oxidant provided to the OSR can be sub-stoichiometric and can have an oxidant-to-fuel molar ratio of less than 1 so that all the oxygen is consumed to near-extinction and less than all the fuel is consumed. By operating under these conditions, only a relatively small portion of the fuel may be consumed, and the temperature of the stream can be raised so that a greater fraction of the hydrocarbons are converted to syngas. Any of a variety of OSRs that have been contemplated in the art may be used. For example, an OSR can use a catalyst for the sub-stoichiometric combustion of fuel in oxidant, but an OSR alternatively may use a specially-designed burner positioned at the top of and within a refractory-lined vessel. Oxidant and fuel mix in the OSR, and the oxidant is fully consumed as heated combustion gas is formed. This gas then passes from the top combustion zone and enters the bottom catalytic zone, where the gas is reacted in the presence of a reforming catalyst specially formulated to withstand the reforming process temperatures.

As to be described, the combination of the CCR and OSR has been found to improve efficiency of a hydrocarbon and steam reforming process with carbon capture in that the strengths of each device work synergistically to overcome the weaknesses of each device working alone. For example, a CCR can be beneficial to produce a high-purity carbon dioxide product at a desired pressure by oxy-combusting the PSA tail gas in an external combustor while using heat of combustion to reform hydrocarbons, such as natural gas, with steam. In operating by itself, however, the CCR ends up consuming a greater amount of oxygen and power in doing so. As well, maximizing heat recovery when using the CCR can be challenging. Operating singularly, the OSR offers a greater single-pass hydrocarbon conversion and consumes less oxygen relative to a CCR while also producing a stream having greater quality of syngas and offering improved heat recovery. The OSR, however, cannot effectively utilize a PSA tail gas with a high carbon dioxide content. It has been found that the combination of an oxy-combustor, a CCR, and an OSR can utilize the PSA tail gas to reform hydrocarbons, thereby permitting the CCR to operate at a reduced relative temperature. Under such operating conditions, the OSR may then be operated at relatively greater temperatures, resulting in greater syngas conversion efficiency by consuming less oxygen. The reforming of the hydrocarbon to syngas is effectively shared between the CCR and the OSR. The CCR reforming load can be adjusted so that substantially all of the combustion duty of the PSA tail gas is consumed, even in embodiments where only partial conversion of the hydrocarbon is achieved. Conversion of the hydrocarbon can be completed in the OSR, and such conversion in the OSR can exceed any level of conversion obtainable in the CCR. The CCR can effectively consume the combustion duty of all of the PSA tail gas that is formed. Although the combustion duty may be used by raising excess steam or generating power, these uses can be less efficient alternatives.

In one or more embodiments, which may be combined with other embodiments, the hot syngas from the OSR 220 can be used for heating one or more further process streams, such as one or more boiler feedwater streams. In the example embodiment of FIG. 2, the syngas in line 222 can be passed through a heat exchanger that can be used for superheating the feed steam for introduction to the CCR. In one or more embodiments, which may be combined with other embodiments, the feed stream may be superheated to a temperature from about 20° C. to about 500° C. The resulting syngas, which is at a reduced temperature, can be split with a first fraction passing through line 226 into boiler 228 and a second fraction passing through line 227 into boiler 229. The first fraction and the second fraction of the syngas may be split substantially equally on a weight or volume basis between the two boilers, or a greater amount on a weight or volume basis may be dedicated to one of boiler 228 and boiler 229, such as an amount of from about 60% to about 80% or such as about 60% to about 70% on a weight or volume basis. In particular, the greater amount of the syngas may be dedicated through line 226 into boiler 228. In one or more embodiments, which can be combined with other embodiments, boilers 228 and 229 may be replaced with or combined as a single boiler, and substantially all of the syngas can flow through this single boiler. However, even in these embodiments, some fraction of the syngas may bypass the heat exchange surfaces of the single boiler and utilized for process control or other purposes. Returning to the embodiment depicted in FIG. 2, the syngas passes from the boilers (228, 229) at a reduced temperature in a range of from about 200° C. to about 550° C., such as about 300° C. to about 425° C., or such as about 300° C. to about 400° C.

Syngas passing from boiler 228 through line 230 combines in line 233 with syngas passing from boiler 229 through line 231 for introduction into conditioning unit 235, which may comprise one component or a plurality of components effective to condition the syngas prior to purification. The conditioning unit 235 may include one or more water gas shift ("WGS") reactors that are configured to and utilized to convert CO with steam to make additional molecular hydrogen according to Equation 2. As part of the conditioning unit 235, the WGS unit or reactor is arranged downstream of the OSR and upstream from one or more components effective for recovering a stream of predominately hydrogen. Since the syngas stream in line 233 retains a significant amount of heat, and since the WGS reactions are exothermic, heat can be recovered from the streams within this system to increase thermal efficiency and to provide heat for other process streams, such as the natural gas introduced via line 201 prior to desulfurization, the mixed feed including steam from line 216 or the boiler feedwater stream(s). As illustrated in FIG. 2, the conditioning unit 235 includes a single WGS reactor and a single heat exchanger, but one of ordinary skill in the art understands that a plurality of WGS reactors may be present in series, each WGS reactor being followed or preceded by a heat exchanger to recover heat, thereby cooling the syngas. The conditioning unit 235 may also include one or more other devices that cool the syngas to near ambient temperatures, such as air coolers, water coolers, or direct contact coolers.

In one or more embodiments, which may be combined with other embodiments, a cooled syngas stream can be provided through line 237 passing from the conditioning unit 235 to a pressure swing adsorber (PSA) 240 or other component effective for recovering a stream of predominately hydrogen from the synthesis gas stream. The syngas in line 237 can be at a pressure in a range of from about 10 bar (1.0 MPa) to about 70 bar (7 MPa), such as about 20 bar (2 MPa) to about 40 bar (4 MPa), or such as about 25 bar (2.5 MPa) to about 35 bar (3.5 MPa). The cooled syngas in line 237 can be at a temperature in a range of from about 10° C. to about 50° C., such as from about 12° C. to about 45° C., such as from about 15° C. to about 40° C., or such as from about 20° C. to about 30° C. The PSA 240 may be, for example, a multi-bed PSA unit and can be configured to provide a stream of purified $H_2$ in line 241 as a $H_2$ product and a tail gas stream in line 242. The PSA can be configured such that the stream in $H_2$ product line 241 can have a hydrogen concentration in a range of from about 80 mol % or greater hydrogen, such as about 90% mol % or greater hydrogen, such as about 95% mol % or greater hydrogen, such as about 99% mol % or greater hydrogen, or such as about 99.9% mol % or greater hydrogen. The residual gas stream in line 242 can comprise a remaining content of $H_2$, as well as any one or more of water, CO, $CO_2$, methane, and inert gases, such as $N_2$ and Ar. In one or more embodiments, which can be combined with other embodiments, one or more PSA units may be utilized and can be effective for providing the necessary hydrogen separation capacity. Other separation units may be excluded since substantially all of the $CO_2$ produced by the system can be captured from the combustion exhaust gas that is used as the heating fluid in the CCR 100 and is subsequently cooled and purified. In alternative embodiments, however, the PSA 240 may be supplemented with one or more additional units effective for providing further separation capabilities, and this can be particularly useful to capture any $CO_2$ present in the syngas. As non-limiting examples, the hydrogen PSA 240 may be followed downstream by one or more additional units effective for separation of one or more materials from the syngas stream in line 237.

All or part of the tail gas stream in line 242 can be introduced to an oxy-fired combustor 250 as fuel, and additional fuel can be added via line 244. The fuel from the one or more sources is combusted in the combustor 250 with an oxidant, such as $O_2$, which may be diluted with a portion of the $CO_2$ containing recycle stream. The oxidant is provided through line 246. A heating fluid comprising freshly generated combustion product passes from the combustor 250 via line 252 into the CCR 100, and the heating fluid particularly can be a $CO_2$-containing stream. In one or more embodiments, which can be combined with other embodiments, the heating fluid may comprise a fluid other than a combustor exhaust stream. For example, a coolant stream that has been heated in a separate process may be used as the heating fluid in the presently disclosed systems and methods. In one or more embodiments, the coolant stream comprises, consists, or consists essentially of helium. Other examples of elevated temperature heat transfer fluids may include molten sulfur and molten salts. Similarly, fluids used for heat transfer from solar thermal or geothermal heat sources may be circulated through the CCR as the heating fluid. The heating fluid passes through the CCR 100 via the shell-side flow path, such as illustrated in the convective reformer of FIG. 1. In FIG. 1, a heating fluid enters heating fluid inlet 130, circulates through the heating fluid space 131 around the outside of the one or more sets of concentrically arranged reaction tubes, and exits the heating fluid outlet 133, all of which elements may be present in the CCR 100 present in the hydrogen production system 200 of FIG. 2.

As shown in FIG. 2, the combustor 250 and CCR 100 may be embodied as two separate and distinct devices. The combustion process may be complete for the heating fluid conveyed by line 252 by the time the heating fluid passes to the CCR via line 252. In one or more embodiments, the combustor 250 may be operated with a slight excess of oxygen through line 246 over what is required for stoichiometric combustion of all fuel provided to the combustor 250 through lines 242 and 244. This excess oxygen helps to ensure that all fuel components are completely consumed, and the presence of any residue, such as carbon monoxide, is substantially reduced or eliminated. The heating fluid in line 252 may be at its adiabatic flame temperature (AFT), and may comprise substantially all of the combustion products, such as $CO_2$ and $H_2O$, potentially along with the excess oxygen and any inert components. The combustion and heat transfer processes carried out in the combustor 250 and the CCR 100, respectively, are separate and sequential to one another. This separate and sequential arrangement of the combustion and heat transfer processes is contrasted with the simultaneous combustion and heat transfer that is typically associated with reformers as part of a conventional SMR system. For instance, in some conventional SMR systems, catalyst-containing reformer tubes are immersed amid combustion flames emitted from burners. The tubes are spaced such that the flames do not impinge on or otherwise cause hot spots on the tube surfaces. As another example, in some other conventional SMR systems, the flames may spread across refractory walls of the furnace which then radiate heat to the catalyst tubes. In both of these examples of conventional SMR systems, the heat transfer is simultaneous with combustion, and the products of the combustion (namely the flue gases) do not achieve the AFT because the combustion process is not adiabatic. Rather, the combustion products exit the reformer in a conventional SMR system at a so-called "Bridgewall temperature," which is less than the AFT; in some cases only about half of the AFT. In addition, the mode of heat transfer in these conventional SMR systems may be predominantly radiative, whereas the mode of heat transfer for the sequential combustion and heat transfer processes of the separate combustor 250 and CCR 100 in FIG. 2 may be primarily convective.

The heating fluid passes from the CCR 100 through line 253 toward a plurality of heat recovery units. Line 253 is split with a first fraction passing through line 254 into heat exchanger 255 and a second fraction passing through line 256 into heat exchanger 257. The first fraction and the second fraction of the heating fluid from line 253 may be split substantially equally on a weight or volume basis between the two heat exchangers, or a greater amount on a weight or volume basis may be dedicated to one of heat exchanger 255 and heat exchanger 257, such as an amount of from about 60% to about 80% or such as about 60% to about 70% on a weight or volume basis. The heating fluid passes from heat exchanger 255 and heat exchanger 257 through lines 258 and 259, respectively, and are combined in line 260 in introduced to the heat recovery unit 262.

In one or more embodiments, which may be combined with other embodiments, the heat recovery unit 262 may comprise a single or a plurality of heat recovery components. Heat exchanger members in the heat recovery unit 262 can include, for example, a waste heat boiler for forming steam from water, a recuperator heat exchanger, or one or more water coolers. The type of heat exchangers and number of heat exchanges can vary. In the example embodiment of FIG. 2, boiler feedwater is heated in a plurality of heat exchangers 263 and 264.

The cooled fluid stream passing from the heat recovery unit 262 in line 265 is introduced into the heat rejection unit 267. Heat rejection unit 267 may comprise one or more heat discarding components, which can be useful for discarding unrecoverable heat, thereby condensing water from combustion, and one or more water removal components. Waste heat may be discarded into the ambient through one or more coolers or direct contact condensers (DCC). The water of combustion may be removed through line 268.

A portion of the cooled and dewatered fluid stream, which is essentially $CO_2$ except for minor amounts of moisture, excess oxygen, and inert components, may be recycled to the combustor 250 via recycle line 270. In one or more embodiments, an optional compressor 269 may be included to facilitate this fluid recycle to combustor 250 via recycle line 270. A portion of the fluid recycled to combustor 250 via recycle line 270 can be admixed with substantially pure oxygen flowing in the line 246 to form the oxidant introduced into the combustor 250. For instance, in one or more examples, the mixture of the recycle stream in recycle line 270 and pure oxygen in the line 246 may yield an oxidant composition having about 25 mol % oxygen. A remainder of the recycle stream in recycle line 270 may be separately introduced to the combustor 250 to limit the AFT of the combustion product. The temperature of the heating fluid exiting the combustor 250 via line 252 may be limited to 1200° C. or less, such as 1100° C. or less, or such as 1000° C. or less. In one or more embodiments, all or part of the fluid recycled back to the combustor 250 via recycle line 270 may be preheated via heat exchange with other cooling streams.

The remaining portion of the cooled fluid stream passes through line 271 for introduction to the $CO_2$ treatment unit 273. The $CO_2$ treatment unit 273 may comprise a single component or may comprise a plurality of components effective for purification of a $CO_2$-rich stream. The $CO_2$ treatment unit 273 may alternatively be called a purification unit as a function of the unit can comprise purifying the stream in line 271 to remove one or more components. In one or more embodiments, which may be combined with other embodiments, up to 100% of the stream in line 271 may be vented to the atmosphere, such as through line 272. Alternatively, substantially 100% of the stream in line 271 may be processed in the $CO_2$ treatment unit 273. As a further alternative, part of the stream in line 271 may be vented through line 272, and the remaining part of the stream in line 265 may be processed in the $CO_2$ treatment unit 273. A treated stream of $CO_2$ may be exported from the hydrogen production system 200 via line 274. The treated stream of $CO_2$ in line 274 may meet the purity, pressure, and temperature requirements for sequestration.

The CO$_2$ treatment unit 273 may be configured to reduce excess oxygen present in the remaining portion of the cooled fluid stream to near extinction, so that it meets the sequestration specifications for oxygen content. Unit 273 may comprise or consist of a deoxygenation unit. Such unit may employ a combustion catalyst, such as platinum, and enable the consumption of all or substantially all residual oxygen via combustion with a fuel, such as hydrogen. The hydrogen may react with oxygen to form water.

The components used in cooling of the syngas in line 222 from the OSR 220 and the heating fluid in line 253 from the CCR 100 can provide heating for optionally two separate streams of feedwater for steam production. In FIG. 2, the dashed line illustrates the feed steam path for forming the steam that is introduced to the CCR in line 216, and the dotted line illustrates the feed steam path for forming a clean steam stream that can be expanded for power production. Feedwater in line 211 can be heated initially in the conditioning unit 235, such as by passage through the one or more heat exchangers therein, and pass through line 212 for further heating with vaporization by passage through boiler 228, passing in line 213. The feed steam in line 213 may then be superheated by passage through heat exchanger 255, passing in line 214, and through heat exchanger 225, passing in line 215. The superheated steam in line 215, which can be at a temperature in a range of from about 300° C. to about 700° C., such as about 400° C. to about 600° C., or such as about 450° C. to about 500° C., can be expanded in a first high-pressure steam turbine 292. The reduced pressure steam in line 216 is then introduced to the CCR 100. Feedwater in line 211 can comprise process condensates obtained from dewatering operations imbedded within conditioning unit 235, heat recovery unit 262, or unit 267. The wet syngas in line 233 may have excess, unreacted process steam, which is condensed in the conditioning unit 235. The wet combustion product in line 260 can have water of combustion that is condensed in one or both of heat recovery unit 262 and unit 267. These condensates can contain dissolved gases, particularly CO$_2$. Fresh water can be imported into the facility and blended with all suitable condensates generated within the plant to result in sufficient feedwater in 211 to meet the steam requirements of the process.

Feedwater in line 280 can be heated initially in the conditioning unit 235, such as by passage through the one or more heat exchangers, and passed through line 281. A first portion of the stream in line 281 may be partitioned in line 282 for passage through boiler 229, passing from boiler 229 in line 285. A second portion of the stream in line 281 may be partitioned in line 283 for passage through boiler 263 in the heat recovery unit 262, passing from boiler 263 in line 284 to be re-combined with line 285. Steam in line 285 may be superheated by passage through heat exchanger 257, passing from the heat exchanger 257 in line 286 for expansion in a second high pressure steam turbine 288. The non-partitioned portion of line 281 may pass through the boiler 264, which can be a low-pressure boiler, in the heat recovery unit 262. The steam in line 287 passing from the boiler 264 in heat recovery unit 262 may combine with the stream in line 289 from the second high pressure steam turbine 288, and the combined stream is expanded in a condensing turbine 290 to provide a clean water stream in line 291. The clean water stream in line 291 can then be substantially returned to the plant as stream 280, such as through a flow loop, a dedicated recycle, or a "closed circuit." Operation in such a closed circuit can be effective to ensure a clean stream is passed to the condensing turbine 290 with minimal contaminants. This can be achieved, for example, by keeping the circuit water out of physical contact with process fluids. In one or more embodiments, which can be combined with other embodiments, the process steam and the turbine steam can be segregated. The process steam and the turbine steam can be processed, generated, and superheated together in separate devices of the same functionality, such as boilers or superheaters. In some embodiments, the acid components are stripped off the condensates prior to use. To the extent that the CO$_2$ in the condensates are stripped off and then vented to the atmosphere, the carbon capture efficiency of the plant would be reduced.

In one or more embodiments, which can be combined with other embodiments, the present disclosure can provide systems and methods for steam generation. As discussed foregoing, steam generation may utilize heat from two separate heat source streams to form steam from two separate water source streams. Although the foregoing discusses the steam generation in relation the syngas stream in line 222 as a first heat source stream and the heating fluid stream in line 253 as a second heat source stream, the systems and methods for steam generation are not limited to such and rather may be utilized for steam generation in a variety of arrangements.

Syngas generation may be carried out using systems and methods comprising a reforming envelope and a steam generation envelope. The term "envelope" indicates a plurality of separate components that are operable together while being physically separate for achieving a common purpose. A reforming envelope can comprise at least one reactor or reaction unit that is configured to generate syngas, such as by reacting one or more hydrocarbons with steam. In FIG. 2, a reforming envelope comprises the CCR 100 and the OSR 220. A reforming envelope, however, may comprise any one or more of: a steam methane reformer (SMR); an autothermal reformer (ATR); a partial oxidation unit (POX); a convective reformer, such as the CCR or a gas heated reformer (GHR); a secondary reformer that is arranged to follow a primary reforming unit or process (for example, an SMR, CCR, or GHR), the secondary reformer being oxygen-fired or air-fired, which combination may be referred to as "combiforming"; a heat exchange reformer (HXR), which comprises a serial or parallel arrangement with other reforming devices, such as an HXR in parallel with an SMR or ATR, or such as a serial arrangement of an HXR in combination with an ATR; or two serial, convective reformers in series with an ATR or OSR. A pre-reformer likewise may be used with any of these combinations of units.

The reforming envelope can be configured to provide a single syngas stream, such as in the case of an ATR or a POX unit. The reforming envelope can be configured to provide a plurality of heat source streams, such as a syngas stream and a combustor offgas or flue gas stream, such as in the case of the combination of an SMR and a CCR. The combination of the CCR and the OSR with an optional pre-reformer, as illustrated in FIG. 2, is an example of a reforming envelope with two heat sources and two heat source streams.

Systems and methods configured for syngas formation, optionally with downstream recovery of isolated fractions of the syngas, such as hydrogen recovery, can require steam generation for use as process steam. The process steam can be used as a reactant in one or more of the units present in the reforming envelope. Steam generation also is effective to cool the hot syngas or other hot gas stream(s) that exits the reforming envelope. Steam may be generated in excess of what is required as process steam in the syngas production process. Excess steam can be exported or used in steam turbines for power generation. Steam used in turbines must be substantially free of impurities or include impurities in less than certain amounts in order to meet stringent requirements for use with different types of turbines, as set by the turbine manufacturers. This can be particularly the case with condensing steam turbines. Process steam, however, is significantly more tolerant to impurity levels of various materials, such as dissolved syngas components, such as $CO_2$, that is present in process condensates. Accordingly, these condensates can be reused with little or no purification, such as steam stripping, which can be utilized to exhaust the dissolved $CO_2$ into the environment. Exhausting $CO_2$ into the environment, however, can be undesired and limits the ability to attain 99.5% capture, or 99.9% capture of $CO_2$. It is advantageous to maintain separate streams of "clean" steam and "unclean" steam.

A steam generation envelope according to the present disclosure can be configured with a first steam generation pathway for forming clean steam from a clean water source and with a second steam generation pathway for forming steam with various levels of impurities from a water source that includes one or more impurities. Utilizing two separate steam pathways can be beneficial to avoid unintended contamination of steam to be used in a steam turbine or avoid the need for water purification processes upstream from one or more steam turbines.

The present disclosure also can provide a steam generation system. Such steam generation system can comprise a reforming envelope configured with a heating line or series of lines for passage of a heat source stream from a heat source. The heat source stream may be divided downstream from the heat source. In some embodiments, the reforming envelope can be configured with a first heating line or series of lines for passage of a first heat source stream from a first heat source and a second heating line or series of lines for passage of a second heat source stream from a second heat source. The steam generation system further can comprise a steam generation envelope comprising: a first steam generation pathway comprising a first water line or series of lines arranged for passage of water from a first water source to a first heat exchange train and passage of steam from the first heat exchange train to one or more steam turbines; and a second steam generation pathway comprising a second water line or series of lines arranged for passage of water from a second water source to a second heat exchange train and passage of steam from the second heat exchange train. In the example embodiment of FIG. 2, the reforming envelope comprises the CCR 100 and the OSR 220 as the first heat source and the second heat source, respectively. Line 253 can provide the first heat source stream while line 222 can provide the second heat source stream. The steam generation envelope comprises the heat exchange elements arranged for cooling the streams in lines 253 and 222 and downstream thereof.

In an alternative embodiment, the reforming envelope can provide a single heat source stream from a single heat source or a single, combined stream from a plurality of heat sources. The steam generation envelope can include a clean steam and an unclean steam pathway that are kept separate from each other. Both paths acquire the heat from the single heat source stream, to preheat water, boil water, and superheat steam. The single heat source stream can be passed serially and at least partially alternatingly between components of the separate steam generation pathways so that heat is transferred to water or steam in the different components of the separate steam generation pathways at different temperature ranges.

The first water line or series of lines can be arranged to be separate from the second water line or series of lines for an entire length of the first steam generation pathway and an entire length of the second steam generation pathway. In one or more embodiments, the first heat exchange train and the second heat exchange train include one or more components in common. The water and steam of the first water line or series of lines and the water and steam of the second water line or series of lines can avoid intermixing at any point along the separate steam generation pathways. The first heat exchange train and the second heat exchange train may be exclusive from one another.

Since each of the first heat source stream and the second heat source stream may provide heat transfer options at multiple different temperature ranges, it can be useful for each of the first heat exchange train and the second heat exchange to have certain components in common for maximizing heat transfer to streams in each of the first steam generation pathway and the second steam generation pathway. For example, in FIG. 2, both of water stream 211 and water stream 280 are heated in the conditioning unit 235 (particularly the heat exchanger(s) present in the conditioning unit). As such, the conditioning unit 235 can be a common component for each of the first heat exchange train and the second heat exchange train. Each of the first heat exchange train and the second heat exchange train also can independently comprise a plurality of components, one or more of which may be shared between the first heat exchange train and the second heat exchange train. In one or more embodiments, which can be combined with other embodiments, one or both of the first heat source and the second heat source can be a syngas production unit. Furthermore, in one or more embodiments, which can be combined with other embodiments, one of the first heat source stream and the second heat source stream may not be a syngas stream. For example, in FIG. 2, the heat source stream passing through line 253 is the heating fluid stream, which comprises the combustion exhaust from the combustor 250, while the heat source stream passing through line 222 is a syngas stream.

In one or more aspects, the present disclosure can provide a steam generation method. Such method can comprise: forming steam along a first steam generation pathway by heating water from a first water source using heat from a first heat source stream; and forming steam along a second steam generation pathway by heating water from a second water source using heat from a second heat source stream; wherein the water from the first water source is not intermixed with the water from the second water source and steam in the first steam generation pathway is not intermixed with steam in the second steam generation pathway. The first water source and the second water source particularly can have different compositions. For example, the one of the first water source and the second water source may be substantially pure water, such as comprising less than 0.1 mol % impurities, such as less than 0.05 mol % impurities, or such as less than 0.01 mol % impurities. A particularly stringent purity requirement from certain manufacturers may require less than 1 parts per million (ppm) of dissolved gases such as CO, $CO_2$, $CH_4$, $O_2$, and acids such as formic and nitric acids, and less than 100 ppm of methanol. On the contrary, the other of the first water source and the second water source may include a significantly greater amount of impurities, such as about 0.1 mol % or greater, such as about 0.5 mol % or greater, or such as about 1 mol % or greater of impurities, which can account for the difference in composition. The one of the first water source and the second water source that is substantially pure water can comprise steam turbine condensates. Since the condensates are continuously recycled through the respective steam generation pathway, impurity levels may be kept in the reduced ranges required by steam turbine manufacturers. One of the first steam generation pathway and the second steam generation pathway thus can comprise one or more steam turbines configured for power production. The condensates may be taken from the one or more steam turbines (see elements 288 and 290 in FIG. 2). The other of the first water source and the second water source comprises process stream condensates. For example, water condensates removed from the combustor exhaust stream may be used as process stream condensates.

Table 1 prophetically illustrates the expected degradation of the hydrocarbon conversion as a function of the CCR catalyst bed exit temperature, which is equivalent to the outlet temperature. For the calculations in Table 1, the feed steam-to-carbon ratio was kept constant at about 3.30 and the outlet was allowed to equilibrate at a constant pressure of 587.5 psia (pounds per square inch absolute).

TABLE 1

| Catalyst Bed Exit Temperature, ° C. | Methane mole %, wet |
| --- | --- |
| 750° C. | 9.48% |
| 800° C. | 6.97% |
| 850° C. | 4.65% |
| 900° C. | 2.77% |

In non-embodiment systems and processes, a relatively high steam-to-carbon ratio and a high outlet temperature would have been used to operate the CCR to achieve a desired conversion rate for the hydrocarbons introduced to produce the syngas. By adding an OSR to embodiment hydrogen plant configurations and processes according to the present disclosure, less severe reforming conditions may be utilized to operate the CCR. The OSR in such configurations and processes can effectively complete the hydrocarbon conversion by increasing the temperature of the CCR product gases to greater temperatures than possible in a CCR provided its inlet feed composition and configuration. For example, the CCR transfers heat across metal tubes, which may degrade under severe reforming conditions; however, the OSR, being configured as eponymously "autothermal", does not have such a material thermal limitation. The introduction of oxygen into the ATR effectively increases the steam-to-carbon ratio since the oxygen is consumed to extinction. This combination of a CCR with an OSR is effective to increase the conversion in both reformers as well as the downstream WGS reactors by permitting each to operate in more favorable chemical equilibrium conditions, which happen to also be less severe operating conditions.

By offloading part of the reforming conversion process from singularly the CCR to an OSR, the CCR can operate at conditions for carbon removal and not at elevated performance for forming syngas. As part of embodiment systems, substantially all the carbon from the process for producing hydrogen from hydrocarbon fuels can be concentrated in the tail gas 242 from the PSA 240. Combustion of this reduced-calorific value tail gas in an oxidant adiabatically produces a mix of hot carbon dioxide and water in line 252 at the AFT via the heat of combustion. The water generated via the combustion is condensed and separated, for example, by gravity, providing a gaseous carbon dioxide product. The heat of combustion is effectively utilized in the CCR to non-adiabatically reform the natural gas to the extent of the available heat of combustion, that is, not completely. Although additional natural gas can be introduced through line 244 for combustion in the combustor 250, the use of the additional fuel may be expressly excluded. Alternatively, the additional fuel may be used as "trim" fuel for startup and control purposes.

The overall efficiency of embodiment hydrogen production process, as well as the carbon capture efficiency, can be increased by several different measures. One such measure is the "Carbon Intensity" (CI) of the process. Reducing the amount of natural gas combusted as fuel not only improves CI but also reduces the generation of steam. Steam more than production requirements has limited value in a non-refinery environment, such as for utilization to generate electricity. However, electricity generated in such a manner is less efficient than commercial processes specifically tuned for power generation. Combustion of excess natural gas also consumes oxygen, which is an added cost; however, such combustion also generates added carbon dioxide, which can partially offset such costs, which can be significantly reduced utilizing the present systems and methods.

Embodiment hydrogen production systems and methods, which combine the reforming functions of a CCR with an OSR, provide multiple advantages. Such combination can enable reduction in the process gas reforming temperature of the CCR, which may enable cheaper materials to be used for the reforming tubes. Such combinations may provide for a greater OSR outlet temperature, which may establish a reforming equilibrium more favorable to single-pass conversion of hydrocarbons to syngas. The combination of CCR with an OSR can enable operation of the CCR at reduced steam-to-carbon ratios. In some embodiments, the combination of units can reduce the heat duty of the CCR, which may reduce capital expenditures (CAPEX) by reducing its unit size. CAPEX may also be reduced by reducing the volume of the carbon dioxide recycle loop, reducing heat exchange costs, recycling power, and heat losses due to incomplete heat recovery.

In one or more embodiments, which may be combined with other embodiments, embodiment hydrogen production systems and processes encompass variations of the arrangement illustrated in FIG. 2 and descibed foregoing. As illustrated in the partial flowchart provided in FIG. 3, the mixed steam and hydrocarbon can be split with a first portion being introduced to the CCR 100 and with a second portion bypassing the CCR 100 (the so-called "bypass gas") for introduction to the OSR 220. A pre-reformer may be included in such instances, although, a pre-reformer may be utilized in the example embodiment of FIG. 2, such as being present upstream of the CCR 100 for pre-reforming of the hydrocarbon feedstock after mixing with the steam in line 216. A pre-reformer 202 as illustrated in FIG. 2 is optionally present for such purpose.

Figure 3:
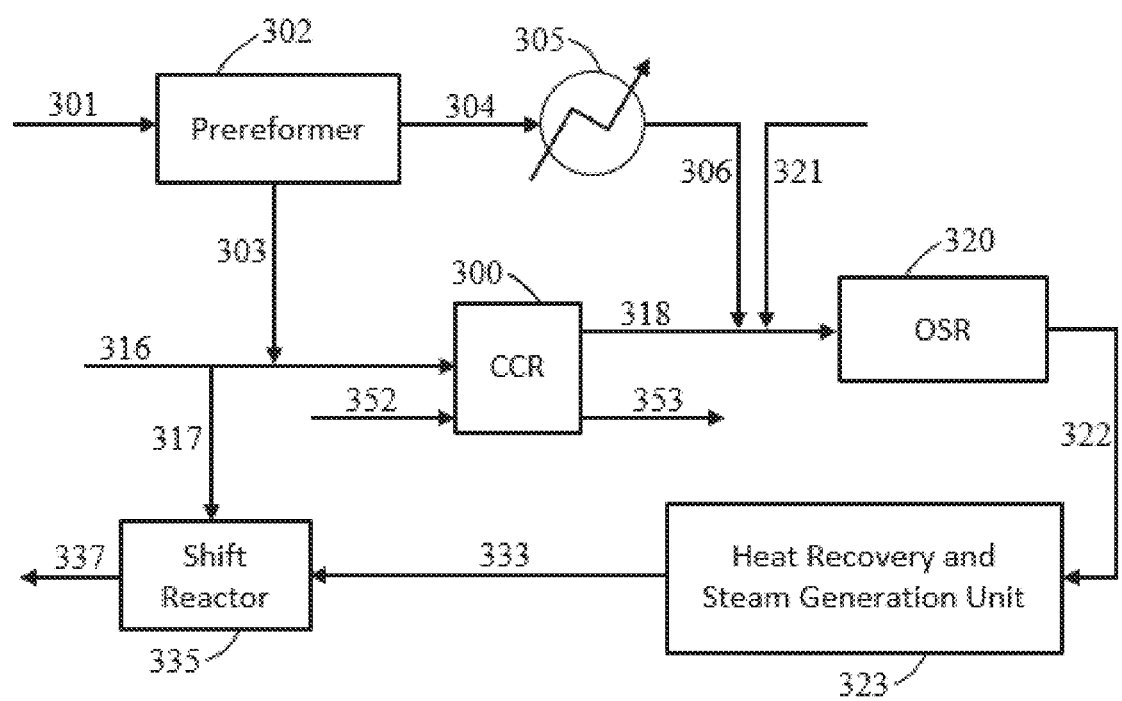
FIG. 3 is a flowchart illustrating a pre-reformer and a bypass pathway for flow of fuel and steam to an OSR according to one or more embodiments of the present disclosure.

In FIG. 3, natural gas or other hydrocarbon feedstock is passed through line 301 with added steam into the pre-reformer 302, which can be configured for pre-reforming of at least a portion of the hydrocarbon feedstock, such as pre-reforming heavier molecules with a greater carbon number than methane according to Equation 1 (with m>1), to minimize risk of coke formation and deposition in the reformer catalyst bed(s). In the pre-reformer 302, the reaction of Equation 1 may be carried out such that heavier hydrocarbons, meaning hydrocarbons with a carbon number greater than methane, such as C2 hydrocarbons (that is, ethane), C3 hydrocarbons (that is, propane), or greater, will react with steam and be reformed into a pre-reformate stream that is substantially devoid of the heavier hydrocarbons. The pre-reformer 302 also may be configured to absorb materials capable of fouling the catalyst bed(s), such as sulfur that was not removed in any desulfurization unit or other materials unexpectedly present in the hydrocarbon feedstock gas or the steam. When a pre-reformer is utilized, a reduced steam-to-carbon ratio may be used as compared to embodiments where none of the hydrocarbon feedstock bypasses the CCR. The hydrocarbon and feed steam can be provided in amounts so that a steam-to-carbon ratio for the stream introduced to the pre-reformer 302 is in a range of from about 0.3 to about 3.0, such as about 0.6 to about 2.2, or such as about 1.0 to about 1.5, inclusive of end points and values in-between. A pre-reformer can be added to any of the cases in Table 2, which is described following. A by-pass arrangement as illustrated in FIG. 3 thus may be utilized to provide further improvements with the combined CCR and OSR. While ATRs have been demonstrated with a steam-to-carbon ratio of less than about 0.6, heated tubular reformers have not been demonstrated with a steam-to-carbon ratio of less than about 1.8 because of the danger of coking up the tubes of the reformer. A purely serial arrangement of a CCR followed by an OSR as depicted in FIG. 2 may constrain the ATR to operate at the steam-to-carbon ratio dictated by the CCR. According to the present disclosure, this constraint can be overcome through bypassing a fraction of the steam and hydrocarbon feed around the CCR 300 for introduction directly into the OSR 320, as described following. By utilizing a reduced steam-to-carbon ratio in the pre-reformer 302 and a greater steam-to-carbon ratio in the CCR 300 with only a portion of the hydrocarbon feed, the bypass arrangement with the combined CCR 300 and OSR 320 can effectively define a "reforming envelope" with a total steam-to-carbon ratio that is reduced overall to make a closer approach to the idealized steam-to-carbon ratio of about 1.0. In one or more embodiments, which may be combined with other embodiments, a total steam-to-carbon ratio of a system and method using a combined CCR and OSR with a partial bypass arrangement can be in the range of from about 1.1 to about 1.9, such as about 1.2 to about 1.8, or such as about 1.2 to about 1.6, inclusive of end points and values in-between. In an example embodiment, the total steam-to-carbon ratio is about 1.4.

Two streams exit the pre-reformer 302 with a first portion passing through a main line 303 and a second portion passing through a bypass line 304. Alternatively, the pre-reformer can have a single outlet, with the outlet stream being split into two portions conveyed by lines 303 and 304. The allocation between the streams can be substantially equal with about 50% of the prereformate being provided through each of lines 303 and 304. In one or more embodiments, which may be combined with other embodiments, a substantially unequal allocation can be provided in lines 303 and 304. For example, one of lines 303 and 304 can be allocated in ar range of from about 55% to about 80% of the prereformate, such as about 55% to about 75%, or such as about 60% to about 75%, and the other of lines 303 ad 304 can be allocated the remaining portion of the prereformate passing from the pre-reformer 302.

The first portion of the prereformate in main line 303 is combined with auxiliary steam in line 316, and the combination of the prereformate and auxiliary steam is introduced to the CCR 300. The auxiliary steam is provided in an amount such that the combined steam-to-carbon ratio associated with the portion of the feed hydrocarbon entering the CCR 300 is in a range of from about 1.5 to about 3, such as about 1.8 to about 2.8, such as about 1.8 to about 2.6, or such as about 1.8 to about 2.5, inclusive of end points and values in-between. This level of steam may enable the CCR 300 to operate without, or substantially without, deposition of coke. The steam and hydrocarbon feed react in the catalyst bed(s) of the CCR 300 to form a process stream comprising syngas that passes from the tube side of the CCR 300 in line 318 at a temperature in a range of from about 600° C. to about 850° C., such as about 675° C. to about 825° C., such as about 700° C. to about 800° C. A heating fluid comprising $CO_2$ is introduced to the shell side of the CCR 300 through line 352, and a cooled heating fluid passes from the shell side of the CCR 300 through line 353.

The second portion of the pre-reformate in bypass line 304 can bypass the CCR 300 and introduce the second portion of the pre-reformate to one or more components downstream from the CCR 300. Optionally, the pre-reformate in bypass line 304 can be heated in heat exchanger 305 and leave in line 306 at a temperature in a range of from about 550° C. to about 750° C., such as about 575° C. to about 725° C., such as about 600° C. to about 700° C. The heated pre-reformate in line 306 is combined with the process stream passing from the CCR 300 in line 318, which is downstream from the CCR 300 and upstream from the OSR 320. The combination of streams, along with substantially pure oxygen in line 321, is introduced to the OSR 320 where syngas is formed and passes from the OSR 320 in line 322. The syngas can be processed in a heat recovery and steam generation unit 323, which can include one or a plurality of individual units. As a non-limiting example, any one or more of heat exchanger 225, boiler 228, and boiler 229 as described in relation to FIG. 2 may be included in the heat recovery and steam generation unit 323 and may perform substantially the same function as previously described. Cooled syngas passes from the heat recovery and steam generation unit 323 through line 333 and then is introduced to a shift reactor 335 along with steam in line 317 which divides from line 316. Although a single shift reactor is illustrated in FIG. 3, the shift reactor 335 may be substantially identical to the conditioning unit 235 and thus may incorporate one or a plurality of WGS reactors as well as one or a plurality of heat exchangers. Shifted and optionally cooled syngas passing from the shift reactor 335 through line 337 may be subject to further processing as previously described, such as processing in a PSA to provide a product $H_2$ stream and a tail gas stream. The tail gas stream can be used as at least a portion of the fuel in an oxy-fired combustor to form the heating fluid stream 352 that is introduced to the shell side of the CCR 300.

Table 2 provides several prophetic determinations based upon non-embodiment and embodiment configurations of the hydrogen production system. Table 2 shows how certain process advantages can be capitalized to produce hydrogen more efficiently and with a reduced CI. In Table 2, "MMSCFD" indicates million standard cubic feet per day, and "MTPD" indicates metric tonnes per day.

TABLE 2

PERFORMANCE SUMMARY

| | Case No. 1 CCR only | Case No. 2 CCR + OSR | Case No. 3 CCR + OSR | Case No. 4 CCR + OSR Split Flow |
|---|---|---|---|---|
| Steam-to-Carbon Ratio | 3.3 | 3.3 | 2.1 | 2.0 |
| CCR Catalyst Temperature (° F. and ° C.) | 1642 (894) | 1300 (704) | 1300 (704) | 1377 (747) |
| $H_2$ Production (MMSCFD) | 100 | 100 | 100 | 100 |
| $O_2$ Consumption (MTPD) | 1607 | 1243 | 1088 | 1097 |
| $CO_2$ Export (MTPD) | 2585 | 2202 | 2039 | 2142 |
| Net Power Import, including ASU (MWe) | 15.9 | 20.1 | 17.7 | 16.6 |
| Overall Gas Efficiency (HHV) ($H_2$ / (NG+)%) | 69.6% | 77.7% | 81.7% | 81.5% |
| Overall Plant Efficiency (HHV) ($H_2$ / (NG + 2xPower)%) | 65.9% | 72.0% | 76.0% | 76.2% |
| CI (kg$CO_2$e / kg $H_2$) | 3.27 | 3.22 | 2.99 | 2.94 |
| $CO_2$ Capture (%) | 99% | 99% | 99% | 99% |

In the first case ("CCR only"), the CCR operates at a significantly greater temperature than the remaining cases—a temperature of about 1642° F. on the catalyst side—to achieve 100 MMSCFD of $H_2$ production. The first case operates at a steam-to-carbon ratio of 3.3.

The second case ("CCR+OSR") utilizes an embodiment of the configuration that has an OSR according to the present disclsoure. The different configurations enable reduction in the CCR outlet temperature to about 1300° F. Internal involuntary excess steam generation and power generation are also reduced, increasing the power imported across battery limits. Oxygen consumption, however, is also reduced, and the efficiency of the process is increased several percentage points. The efficiency of the process is higher even allowing for the reduced internal power generation, since less oxygen is required. The Carbon Intensity (CI) also drops slightly.

The third case ("CCR+OSR") utilizes an embodiment of the configuration that has additional improvements when using the OSR according to the present disclosure. Specifically, the steam-to-carbon ratio can be lowered to 2.1, which begins approaching the minimum stoichiometric amount of steam: carbon (that is, 1.0) that can be used in a steam reforming process for methane to syngas. Additional steam is used to drive the equilibrium towards products and prevent undesrable side reactions, most notably coking. Additional steam also consumes additional oxygen in the OSR. Moreover, additional steam is not required when an OSR is used since the oxygen feed to an OSR leads to production of additional steam. The OSR also enables higher processing temperatures than the CCR, which is an alternative route to ensure better conversion in the endothermic reforming process. Additional stoichiometric steam-to-carbon ratio of 1.0 is required at the downstream WGS reactor, but this is more efficiently provided by steam injection at the WGS inlet, which avoids additional oxygen consumption in the OSR. There is a further increase in efficiency by several percentage points, reduction in oxygen and carbon dioxide, and a noticable reduction in CI.

The fourth case ("CCR+OSR Split Flow") presents results for a 50% bypass of the pre-reformer outlet gas around the CCR, such as is depicted in FIG. 3. The steam-to-carbon ratio in line 301 to the pre-reformer is approximately 0.6. Addtionally, steam via line 316 is injected into the portion of the pre-reformate in line 303 destined for the CCR. The CCR itself operates at a steam-to-carbon ratio of approximatey 3.4 for its share of the hydrocarbon feed. No steam is injected into the portion of the pre-reformate in the bypass lines 304 and 306. The overall steam-to-carbon ratio in the reforming envlope is approximately 2.0 [calculated (50%× 3.4)+(50%×0.6)]. The CCR exit temperature can be configured to be in a range effective to consume the firing from all of the PSA tailgas, such as a temperature of from about 700° C. to about 800° C., such as about 725° C. to about 775° C., or such as approximately 750° C. In an example embodiment, CCR exit temperature is approximately 1377° F. (747° C.). About 10% of additional firing can be provided by natural gas trim fuel. The plant effciency is slightly higher, and the CI is somewhat reduced relative to the unsplit case. The amount of mixed-feed gas processed by the pre-reformer 302 has also been reduced resulting in a proportionate savings in its size and usage of the expensive prereforming catalyst. The bypass can provide flexibility in the operation of the present systems and methods.

The terms "about" or "substantially" as used herein can indicate that certain recited values or conditions are intended to be read as encompassing the expressly recited value or condition and values that are relatively close thereto or conditions that are recognized as being relatively close thereto. For example, unless otherwise indicated herein, a value of "about" a certain number or "substantially" a certain value can indicate the specific number or value as well as numbers or values that vary therefrom (±) by 10% or less, such as 5% or less, such as 4% or less, such as 3% or less, such as 2% or less, or such as 1% or less, and any one of such values may be used interchangeably with the words "about" or "substantially" as needed for clarity. Similarly, unless otherwise indicated, a condition that substantially exists can indicate the condition is met exactly as described or claimed or is within typical manufacturing tolerances or would appear to meet the required condition upon casual observation even if not perfectly meeting the required condition. In some embodiments, the values or conditions can be defined as being express and, as such, the term "about" or "substantially" (and the noted variances) can be excluded from the express value.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described and that modifications and other embodiments are intended to be included within the scope of the appended claims. Although specific terms are employed, they are used in a generic and descriptive sense only and not for purposes of limitation.

All publications, patent applications, patents, sequences, database entries, and other references mentioned in this document are incorporated by reference in their entirety. In case of conflict, the present specification, including definitions, is controlling.

The invention claimed is:

1. A process for hydrogen production comprising:
introducing at least one reactant stream into a $CO_2$ convective reformer (CCR) that is heated by a heating fluid stream and reforming hydrocarbon and steam from the at least one reactant stream to form a process stream;
passing an oxidant and at least a portion of the process stream through an oxygen secondary reformer (OSR) operating under conditions effective to reform hydrocarbon and steam and provide a synthesis gas stream;
processing at least a portion of the synthesis gas stream in one or more components effective for recovering a stream of predominately hydrogen ($H_2$) from the synthesis gas stream; and
combusting a fuel with an oxidant in a combustor to form a combustion product stream that comprises at least a portion of the heating fluid stream;
wherein the one or more components effective for separating a stream of predominately hydrogen from the synthesis gas stream is further effective to provide a tail gas, and wherein the process comprises introducing at least a portion of the tail gas to the combustor.

2. The process of claim 1, comprising introducing a first portion of the at least one reactant stream into the CCR and introducing a second portion of the at least one reactant stream into one or more components downstream from the CCR and such that the second portion of the at least one reactant stream bypasses the CCR.

3. The process of claim 2, further comprising processing the at least one reactant stream in a pre-reformer from which the first portion of the at least one reactant stream passes to the CCR and from which the second portion of the at least one reactant stream passes to the one or more components downstream from the CCR.

4. The process of claim 3, wherein the first portion of the at least one reactant stream is combined with an auxiliary steam stream that is introduced to the CCR.

5. The process of claim 2, comprising introducing the second portion of the at least one reactant stream to a line configured for passage of the process stream, the introducing being at a position downstream from the CCR and upstream from the OSR.

6. The process of claim 2, comprising introducing the second portion of the at least one reactant stream directly into the OSR.

7. The process of claim 1, further comprising passing the heating fluid stream from the CCR through one or more heat recovery units configured to transfer heat from the heating fluid stream to one or more further streams and form a spent heating fluid stream.

8. The process of claim 7, further comprising passing the spent heating fluid stream through one or more purification units effective to form a stream of recycle carbon dioxide ($CO_2$).

9. The process of claim 8, further comprising passing at least a portion of the stream of recycle $CO_2$ to the combustor.

10. The process of claim 1, comprising passing the synthesis gas stream from the OSR through one or more heat recovery units configured to transfer heat from the synthesis gas stream to one or more further streams.

11. The process of claim 10, wherein the one or more heat recovery units comprises one or more boilers.

12. The process of claim 1, wherein the one or more components effective for separating a stream of predominately hydrogen from the synthesis gas stream includes a pressure swing adsorption (PSA) unit.

13. The process of claim 1, further comprising passing at least a portion of the synthesis gas stream from the OSR through one or more water gas shift (WGS) units downstream from the OSR and upstream from the one or more components effective for separating a stream of predominately hydrogen.

14. A process for hydrogen production comprising:
introducing at least one reactant stream into a $CO_2$ convective reformer (CCR) that is heated by a heating fluid stream and reforming hydrocarbon and steam from the at least one reactant stream to form a process stream;
passing an oxidant and at least a portion of the process stream through an oxygen secondary reformer (OSR) operating under conditions effective to reform hydrocarbon and steam and provide a synthesis gas stream;
processing at least a portion of the synthesis gas stream in one or more components effective for recovering a stream of predominately hydrogen ($H_2$) from the synthesis gas stream;
introducing a first portion of the at least one reactant stream into the CCR and introducing a second portion of the at least one reactant stream into one or more components downstream from the CCR and such that the second portion of the at least one reactant stream bypasses the CCR; and
processing the at least one reactant stream in a pre-reformer from which the first portion of the at least one reactant stream passes to the CCR and from which the second portion of the at least one reactant stream passes to the one or more components downstream from the CCR.

15. The process of claim 14, wherein the first portion of the at least one reactant stream is combined with an auxiliary steam stream that is introduced to the CCR.

16. A process for hydrogen production comprising:
introducing at least one reactant stream into a $CO_2$ convective reformer (CCR) that is heated by a heating fluid stream and reforming hydrocarbon and steam from the at least one reactant stream to form a process stream;
passing an oxidant and at least a portion of the process stream through an oxygen secondary reformer (OSR) operating under conditions effective to reform hydrocarbon and steam and provide a synthesis gas stream;
processing at least a portion of the synthesis gas stream in one or more components effective for recovering a stream of predominately hydrogen ($H_2$) from the synthesis gas stream;
combusting a fuel with an oxidant in a combustor to form a combustion product stream that comprises at least a portion of the heating fluid stream;
passing the heating fluid stream from the CCR through one or more heat recovery units configured to transfer heat from the heating fluid stream to one or more further streams and form a spent heating fluid stream; and passing the spent heating fluid stream through one or more purification units effective to form a stream of recycle carbon dioxide ($CO_2$).

17. The process of claim 16, further comprising passing at least a portion of the stream of recycle $CO_2$ to the combustor.

* * * * *